(12) United States Patent
Kawai

(10) Patent No.: US 8,954,497 B2
(45) Date of Patent: Feb. 10, 2015

(54) PARALLEL DISTRIBUTED PROCESSING METHOD AND COMPUTER SYSTEM

(71) Applicant: Hitachi, Ltd., Chiyoda-ku, Tokyo (JP)

(72) Inventor: Ryo Kawai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 13/845,525

(22) Filed: Mar. 18, 2013

(65) Prior Publication Data

US 2013/0218943 A1    Aug. 22, 2013

Related U.S. Application Data

(63) Continuation of application No. 12/725,563, filed on Mar. 17, 2010, now Pat. No. 8,423,605.

(30) Foreign Application Priority Data

Jan. 21, 2010   (JP) .................................. 2010-010757

(51) Int. Cl.
```
G06F 15/16      (2006.01)
H04L 29/08      (2006.01)
G06F 9/50       (2006.01)
```
(52) U.S. Cl.
CPC ........ *H04L 29/08135* (2013.01); *G06F 9/5066* (2013.01)
USPC ........... 709/203; 709/201; 709/206; 712/200; 712/203; 712/220; 718/100; 718/101; 718/102; 718/105

(58) Field of Classification Search
USPC .............................................. 709/201, 203
See application file for complete search history.

(56) References Cited

U.S. PATENT DOCUMENTS

| | | | |
|---|---|---|---|
| 8,332,207 B2 | 12/2012 | Brants et al. | |
| 2007/0118601 A1* | 5/2007 | Pacheco | 709/206 |
| 2008/0086442 A1* | 4/2008 | Dasdan et al. | 707/1 |
| 2008/0098323 A1* | 4/2008 | Vallone et al. | 715/772 |
| 2010/0005080 A1* | 1/2010 | Pike et al. | 707/4 |

(Continued)

FOREIGN PATENT DOCUMENTS

| | | |
|---|---|---|
| JP | 2010-522938 A | 7/2010 |
| WO | 2008118905 A2 | 10/2008 |

OTHER PUBLICATIONS

Jeffrey Dean et al., "MapReduce: Simplified Data Processing on Large Clusters," Google, Inc., 2004.

(Continued)

*Primary Examiner* — Hamza Algibhah
*Assistant Examiner* — Natisha Cox
(74) *Attorney, Agent, or Firm* — Mattingly & Malur, PC

(57) ABSTRACT

Provided is a parallel distributed processing method executed by a computer system comprising a parallel-distributed-processing control server, a plurality of extraction processing servers and a plurality of aggregation processing servers. The managed data includes at least a first and a second data items, the plurality of data items each including a value. The method includes a step of extracting data from one of the plurality of chunks according to a value in the second data item, to thereby group the data, a step of merging groups having the same value in the second data item based on an order of a value in the first data item of data contained in a group among groups, and a step of processing data in a group obtained through the merging by focusing on the order of the value in the first data item.

12 Claims, 19 Drawing Sheets

(56) References Cited

U.S. PATENT DOCUMENTS

2010/0122065 A1* 5/2010 Dean et al. .................... 712/203
2010/0235485 A1* 9/2010 Lillibridge ................... 709/223
2010/0287554 A1* 11/2010 Amundsen et al. ........... 718/101

OTHER PUBLICATIONS

Youhei Sasaki, "A platform to build a private cloud of an open source, Apache Hadoop", IT Architect vol. 22, Japan, IDG Japan, May 14, 2009, pp. 64-79.

* cited by examiner

235

DATA DIVISION MANAGEMENT TABLE

| LOGICAL DATA ID 413 | DATA CHUNK IDENTIFIER 411 | DATA MANAGEMENT SERVER NODE ID 412 |
|---|---|---|
| DATA1 | T1 | HOST10 |
|  |  | HOST12 |
|  | T2 | HOST15 |
|  |  | HOST11 |
|  | T3 | HOST13 |

DATA ALLOCATION MANAGEMENT TABLE

| DATA CHUNK IDENTIFIER 421 | GROUP-EXTRACTION-PROCESSING NODE ID 422 |
|---|---|
| T1 | HOST1 |
| T2 | HOST2 |
| T2 | HOST3 |

DATA OBTAINED BY MERGING INTERMEDIATE DATASETS FOR TOLLGATE "Y"

| TOLLGATE ID | TIME | CARD ID | PROCESSING ID |
|---|---|---|---|
| Y | 061546 | 120 | OUT |
| Y | 061555 | 150 | OUT |
| Y | 121820 | 50 | OUT |
| Y | 233045 | 25 | OUT |

DATA OBTAINED BY MERGING INTERMEDIATE DATASETS FOR TOLLGATE "X"

| TOLLGATE ID | TIME | CARD ID | PROCESSING ID |
|---|---|---|---|
| X | 031545 | 100 | OUT |
| X | 121604 | 200 | OUT |
| X | 231821 | 160 | OUT |

OUTPUT DATA OBTAINED THROUGH ANALYSIS FOR TOLLGATE "Y"

1014     1231     1232     1233

| TOLLGATE ID | TIME ZONE | MALE RATIO | AVERAGE AGE |
|---|---|---|---|
| Y | 10:00-11:00 | 50 % | 27.4 |
| Y | 11:00-12:00 | 45 % | 35.1 |
| Y | 12:00-13:00 | 70 % | 32.9 |
| ⋮ | | | |
| Y | 23:00-24:00 | 85 % | 37.1 |

OUTPUT DATA OBTAINED THROUGH ANALYSIS FOR TOLLGATE "X"

1014     1231     1232     1233

| TOLLGATE ID | TIME ZONE | MALE RATIO | AVERAGE AGE |
|---|---|---|---|
| X | 10:00-11:00 | 70 % | 34.1 |
| X | 11:00-12:00 | 55 % | 30.4 |
| X | 12:00-13:00 | 65 % | 29.8 |
| ⋮ | | | |
| X | 23:00-24:00 | 100 % | 45.0 |

PARALLEL DISTRIBUTED PROCESSING METHOD AND COMPUTER SYSTEM

CLAIM OF PRIORITY

This application is a continuation of U.S. patent application Ser. No. 12/725,563, filed Mar. 17, 2010, which claims priority from Japanese patent application JP 2010-10757 filed on Jan. 21, 2010, the content of which is hereby incorporated by reference into this application.

BACKGROUND OF THE INVENTION

This invention relates to parallel distributed processing and a computer system for processing, by a plurality of distributed computers, a large quantity of sequence data in parallel.

In recent years, sensor devices utilizing, for example, radio frequency identification (RFID) and an integrated circuit (IC) card are used in various occasions. Moreover, a large quantity of sequence data can be acquired from these sensor devices. The sequence data is a set of pieces of data which include a plurality of data items each containing a set value, and are arranged according to a value of a given data item (referred to as sequence data item). Generally, the sequence data is accumulated in order of the sequence data item in a system, and taken out from the system and used while the order is still maintained.

There has been an attempt to analyze changes and trends of the sequence data, and use the analyzed results for business activities. For example, there is an attempt to install a plurality of sensors on a construction machine, and, based on trends and changes of time-series data acquired from the sensor devices, to analyze the state of the construction machine, so as to use the analyzed results for a maintenance of the construction machine. In this attempt, generally, an analysis application of the batch processing type is used to apply grouping and filtering to the large quantity of sequence data acquired from the sensor devices, and then to apply aggregation processing to the data focusing on the order of the sequence data item.

As a technology for realizing the processing carried out by the analysis application, MapReduce is known as disclosed in US 2008/0086442 and "MapReduce: Simplified Data Processing on Large Clusters" Jeffrey Dean, Sanjay Ghemawat, Google Inc. OSDI'04: Sixth Symposium on Operating System Design and Implementation, San Francisco, Calif., Dec. 6, 2004. MapReduce is a programming model which simplifies the analysis processing applied to the data into group extraction processing (Map processing), and the data aggregation processing (Reduce processing). The group extraction processing is processing of grouping divided data using a data item (key) for extracting specific groups, and outputting results as intermediate datasets. The data aggregation processing is processing of aggregating the data by merging the intermediate datasets output by the group extraction processing, and outputting the results.

As a result, an execution engine of MapReduce can determine a unit of the division for the analysis application, and can control the parallel processing. Moreover, the processing can be allocated dynamically to a plurality of computers, and thus the execution engine of MapReduce is suitable for a system having a large-scale parallel configuration using a large number of computers. Further, for a developer, there is provided a merit that it is not necessary to be aware of how the distributed processing is carried out among the plurality of computers, and it is only necessary to define a method for the group extraction processing and a method for the data aggregation processing. Still further, for an operator, there is provided a merit that flexible sizing and scheduling are possible in a large-scale environment.

SUMMARY OF THE INVENTION

However, when the above-mentioned analysis application carries out the group extraction processing from a large quantity of sequence data without assuming that the sequence data is arranged in the order of the sequence data item, and carries out the data aggregation processing assuming that the sequence data is arranged in the order of the sequence data item, there is a problem that overall processing does not efficiently progress.

This is because, when the sequence data output by the group extraction processing is not arranged in the order of the sequence data item, before the data aggregation processing or in part of the data aggregation processing, it is necessary to add processing of rearranging the sequence data output by the group extraction processing in the order of the sequence data item one piece by one piece.

A description is given of this problem while a traffic data analysis system for analyzing data on motor vehicle traffic is taken as an example. The traffic data analysis system is a parallel distributed processing system used by an analysis application for analyzing customer attributes per unit time which relate to motor vehicles exiting each of tollgates. It should be noted that the traffic data is sequence data having, as a sequence data item, time information acquired when a motor vehicle carrying an IC card passes a tollgate. The traffic data contains, in addition to the time information, an IC card identifier, a tollgate identifier, and a traffic identifier indicating entry or exit. This traffic data is stored in the order of the sequence data item (time information) in a central server.

On this occasion, the analysis application carries out processing in the following order.

1. Grouping the large quantity of traffic data stored in the central server according to a data item (tollgate identifier) different from the sequence data item (time information), thereby extracting exit traffic data for each of the tollgates (group extraction processing).
2. Aggregating the exit traffic data for each of the tollgates extracted by the first processing in the order of the sequence data item (time information), and analyzing the customer attributes per unit time (data aggregation processing).

In the first processing, a server controlling the parallel distributed processing divides the traffic data stored in the central server from the head into a plurality of data chunks, allocates a chunk of data to each of a plurality of servers for carrying out the group extraction processing, and requests the servers to carry out the group extraction processing. The chunk of data contains the traffic data in the order of the sequence data item (time information).

Then, each of the plurality of servers for carrying out the group extraction processing groups the chunk of data allocated to the own device according to the tollgate identifier and the exit traffic identifier as keys, and outputs the exit traffic data for the respective tollgates as intermediate datasets. When the chunk of data contains data for two tollgates "X" and "Y", traffic data for the exit from the tollgate "X" and traffic data for the exit from the tollgate "Y" are output as intermediate datasets.

Then, a server for carrying out the data aggregation processing acquires, out of intermediate datasets output from the plurality of servers for carrying out the group extraction processing, intermediate datasets having the same value as the tollgate identifier by bulk transfer, and merges the acquired intermediate datasets. On this occasion, a progress of the execution by the servers controlling the parallel distributed processing is not controlled, and thus it cannot be expected that the data acquired by merging the intermediate datasets is arranged in the order of the sequence data item (time information).

Thus, before the second processing or in part of the second processing, based on the sequence data item (time information), it is necessary to add the processing of rearranging the traffic data piece by piece. As a result, it takes a long time for the conventional traffic data analysis system to process the large quantity of the traffic data.

In view of the above-mentioned problem, this invention has been made, and therefore has an object to provide a parallel distributed processing method and a computer system which are capable of efficiently processing a large quantity of sequence data.

A representative aspect of this invention is as follows. That is, there is provided a parallel distributed processing method executed by a computer system comprising: a data management server for managing sequence data; a parallel-distributed-processing control server for dividing the sequence data into a plurality of chunks, and controlling parallel distributed processing to be applied to the sequence data; a plurality of extraction processing servers each for extracting data included in one of the plurality of chunks obtained through the dividing; and a plurality of aggregation processing servers for merging data extracted by the plurality of extraction processing servers, and processing the merged data. The sequence data includes a plurality of pieces of data each including a plurality of data items including at least a first data item and a second data item, the plurality of data items each including a value. The parallel distributed processing method includes: a first step of extracting, by each of the plurality of extraction processing servers, data from one of the plurality of chunks according to a value in the second data item, to thereby group the data; a second step of merging, by each of the plurality of aggregation processing servers, groups having the same value in the second data item based on an order of a value in the first data item of data included in a group among groups; and a third step of processing, by the each of the plurality of aggregation processing servers, data in a group obtained through the merging by focusing on the order of the value in the first data item.

According to the representative embodiments of this invention, when, for a large quantity of sequence data, the group extraction processing which does not assume that the sequence data is arranged in the order of a sequence data item is carried out, and then, the data aggregation processing which assumes that the data is arranged in the order of the sequence data item is carried out, the overall processing can be efficiently carried out.

Specifically, when the data aggregation processing is carried out, by rearranging the data on a group basis and merging the rearranged data, before the data aggregation processing or in part of the data aggregation processing, without rearranging the traffic data piece by piece based on the sequence data item, a series of processings can be carried out at high speed.

DETAILED DESCRIPTION OF THE PREFERRED EMBODIMENTS

The present invention can be appreciated by the description which follows in conjunction with the following figures, wherein:

FIG. 3A is a diagram illustrating an example of the data division management table according to the first embodiment of this invention;

FIG. 3B is a diagram illustrating an example of the data allocation management table according to the first embodiment of this invention;

Figure 10A:
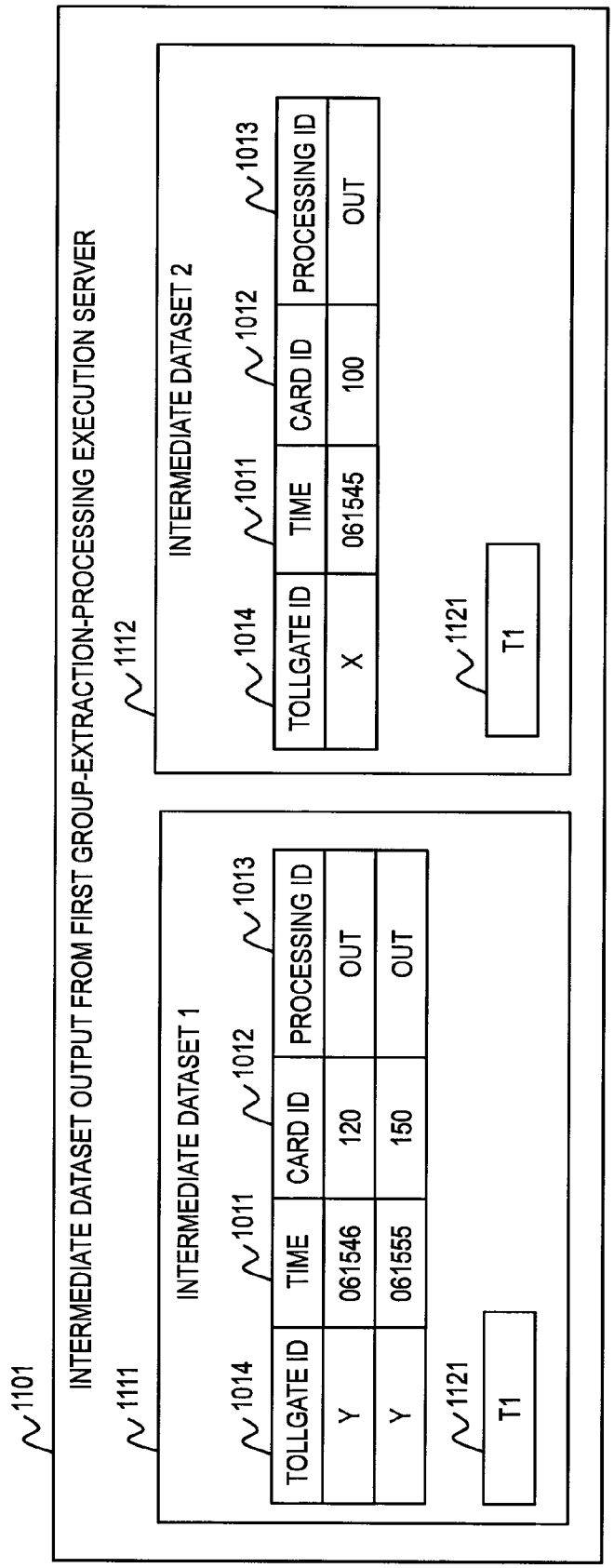
Figure 10B:
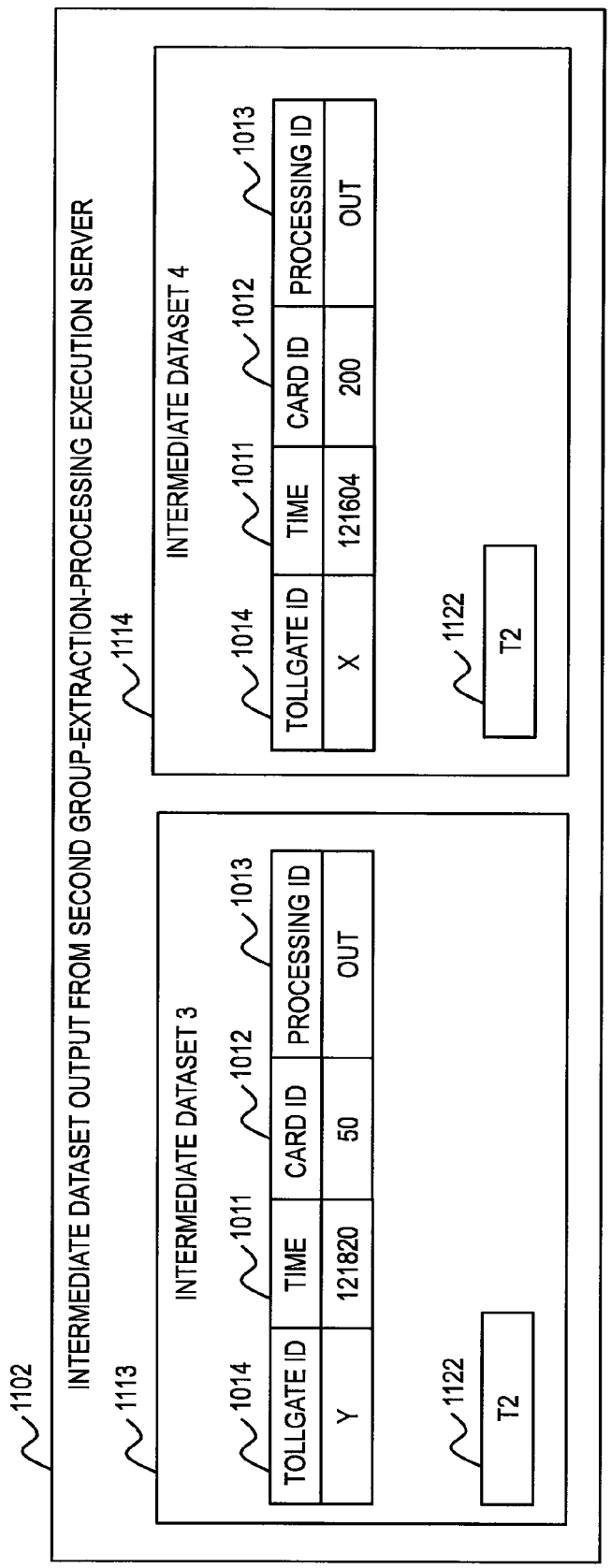
Figure 10C:
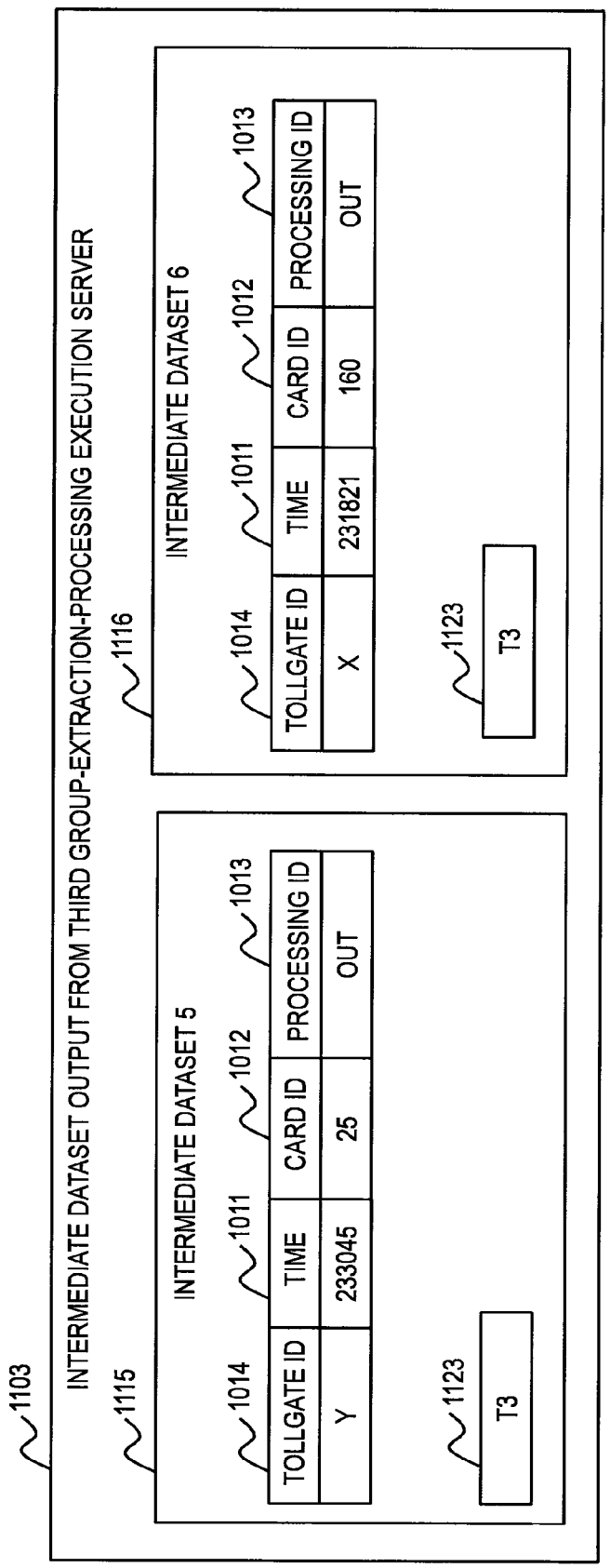
Figure 13:
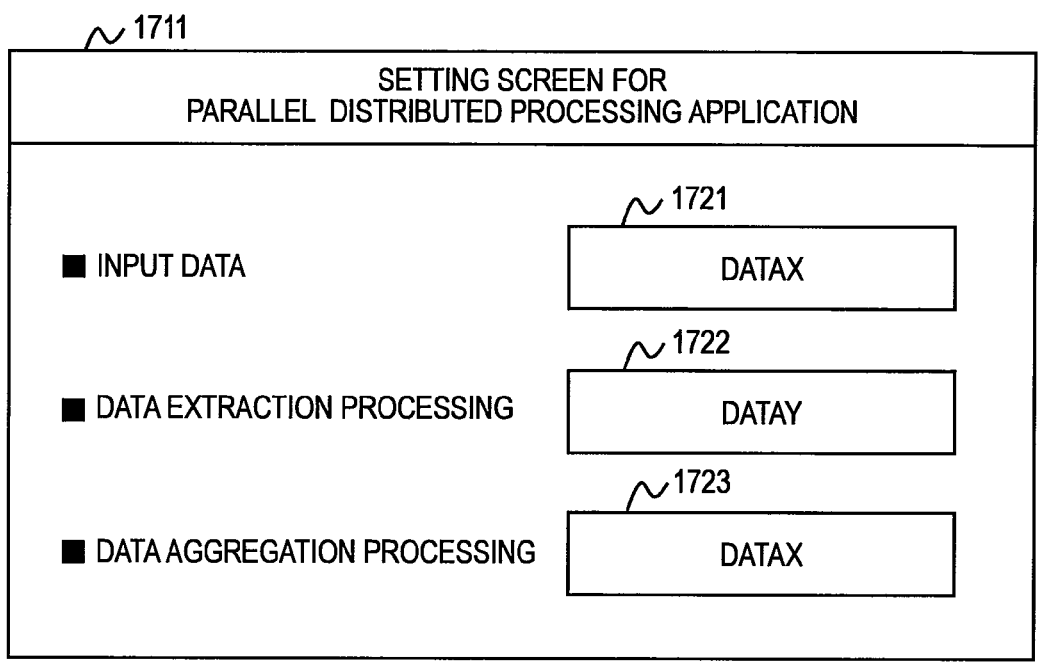
Figure 14:
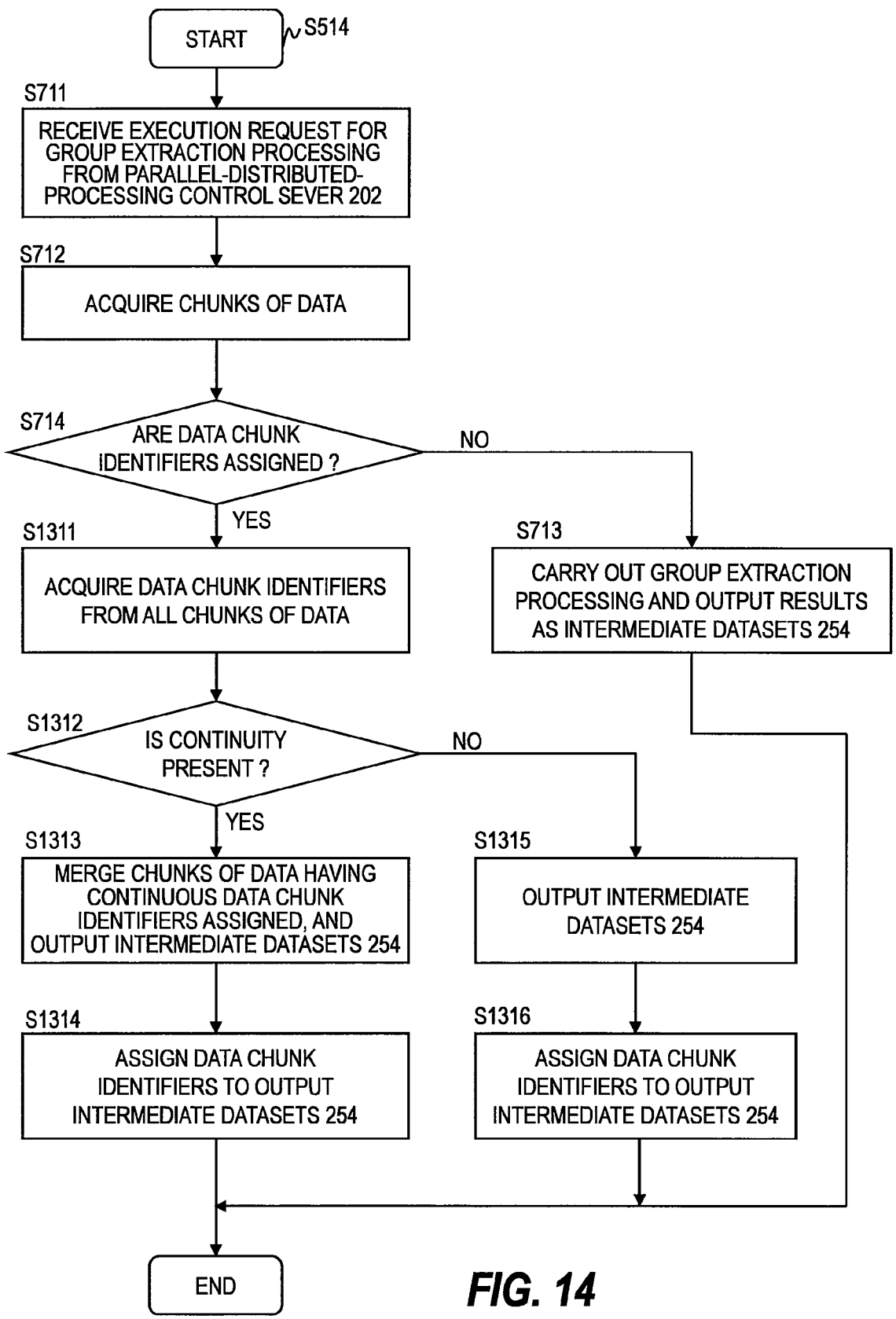
Figure 15:
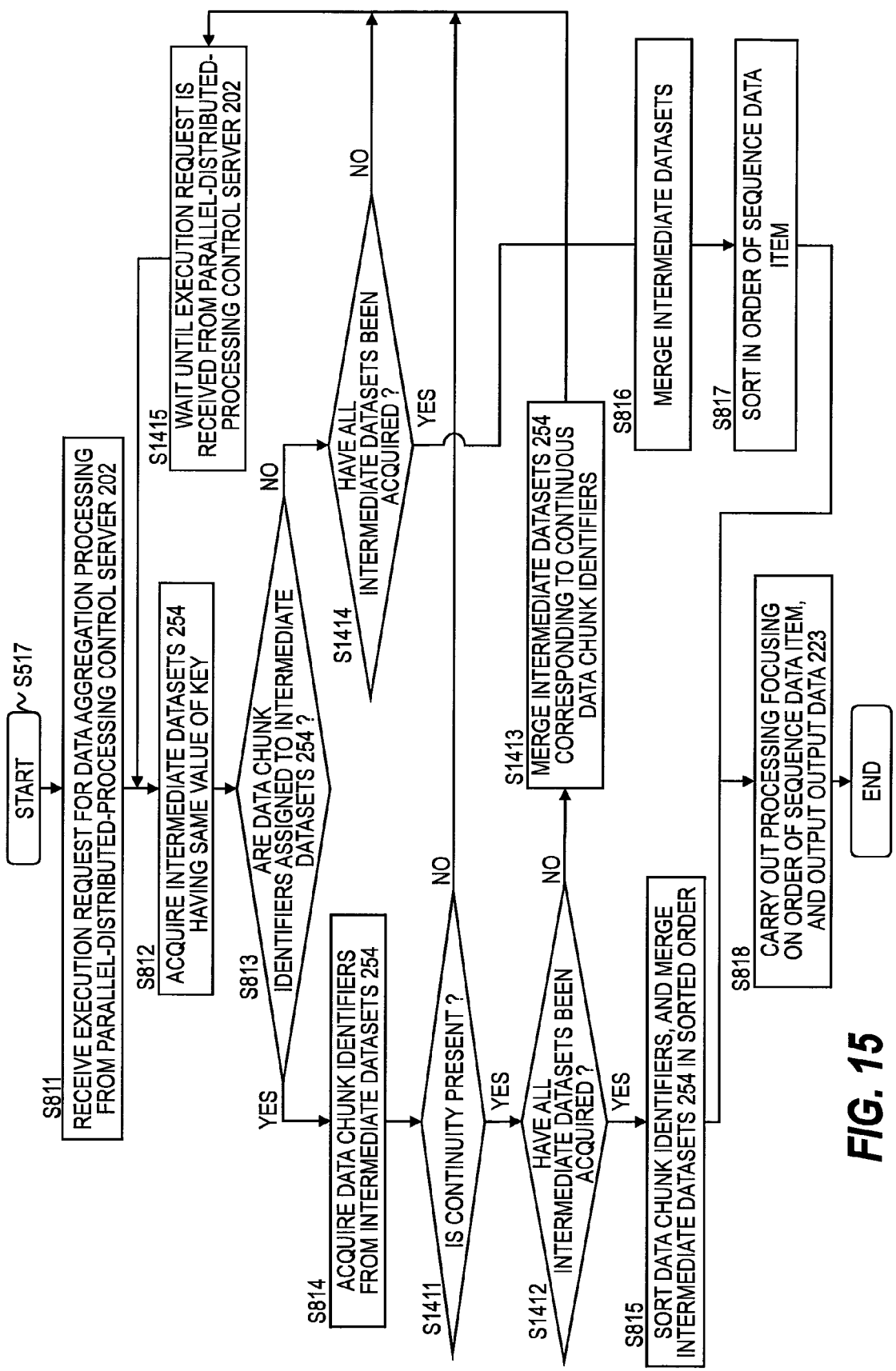
Figure 16:
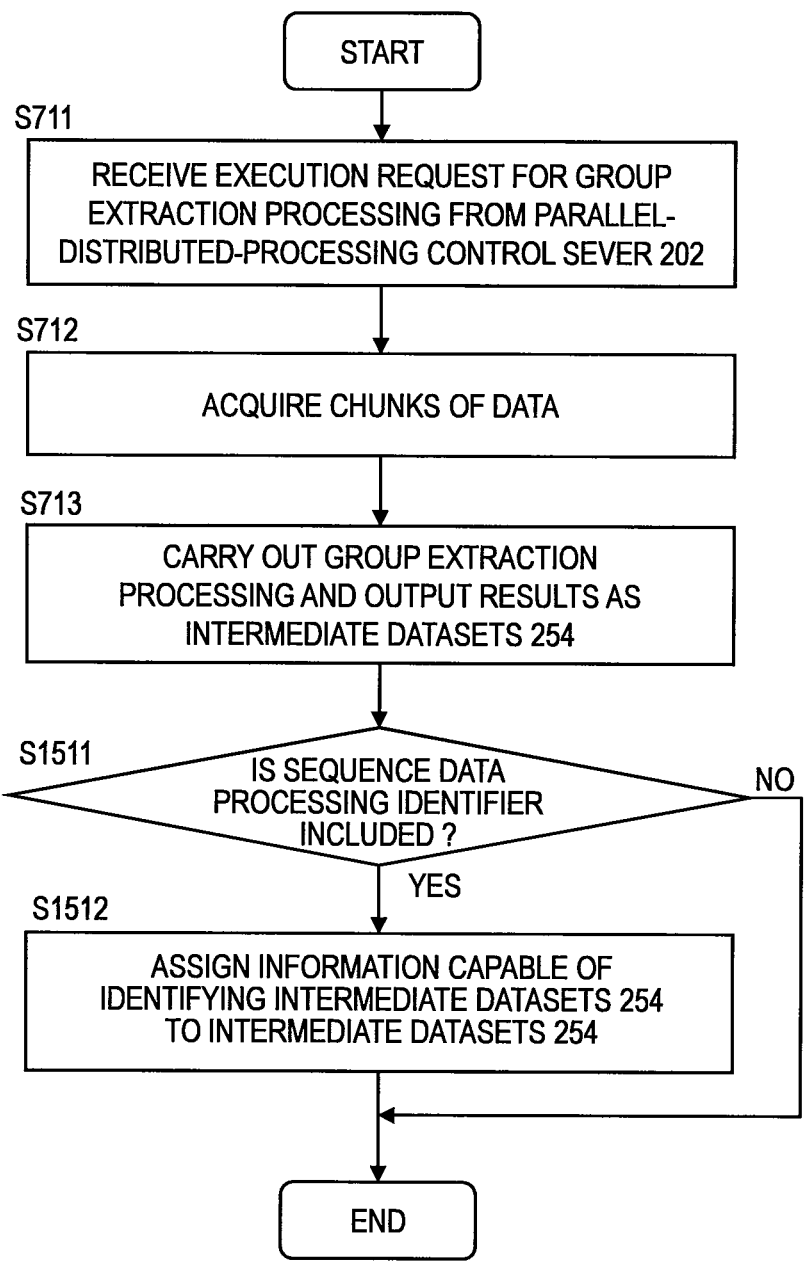
Figure 17:
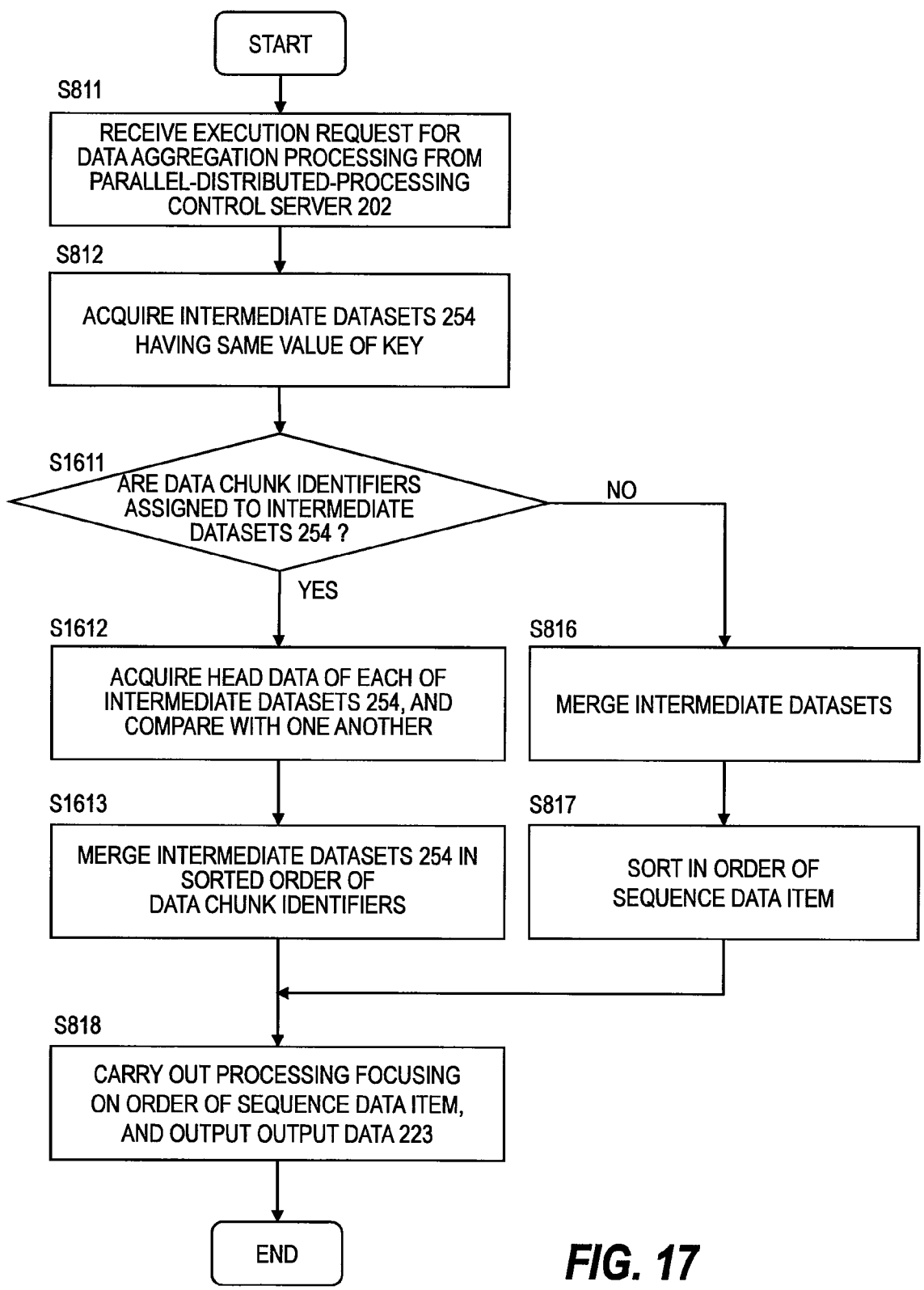

FIGS. 10A, 10B, and 10C illustrate an example of the intermediate datasets of the traffic data analysis system according to the first embodiment of this invention;

FIGS. 11A and 11B illustrate examples of the data obtained by merging the intermediate datasets of the traffic data analysis system according to the first embodiment of this invention;

FIGS. 12A and 12B illustrate examples of the output data of the traffic data analysis system according to the first embodiment of this invention;

FIG. 13 illustrates an example of the input interface used for inputting the information necessary for judging the execution conditions of the parallel distributed processing application according to the first embodiment of this invention;

FIG. 14 is a flowchart illustrating the processing steps when the group-extraction-processing module according to the first embodiment of this invention processes a plurality of chunks of data as the input data;

FIG. 15 is a flowchart illustrating the processing steps when the data aggregation processing module according to the first embodiment of this invention carries out the processing without waiting for the completion of the processing by all the group-extraction-processing execution servers;

FIG. 16 is a flowchart illustrating processing steps of the group extraction processing module according to the second embodiment of this invention; and FIG. 17 is a flowchart illustrating processing steps of the data aggregation processing module according to the second embodiment of this invention.

DETAILED DESCRIPTION OF THE PREFERRED EMBODIMENTS

A description is given of embodiments of this invention referring to the drawings.

First Embodiment

Figure 1:
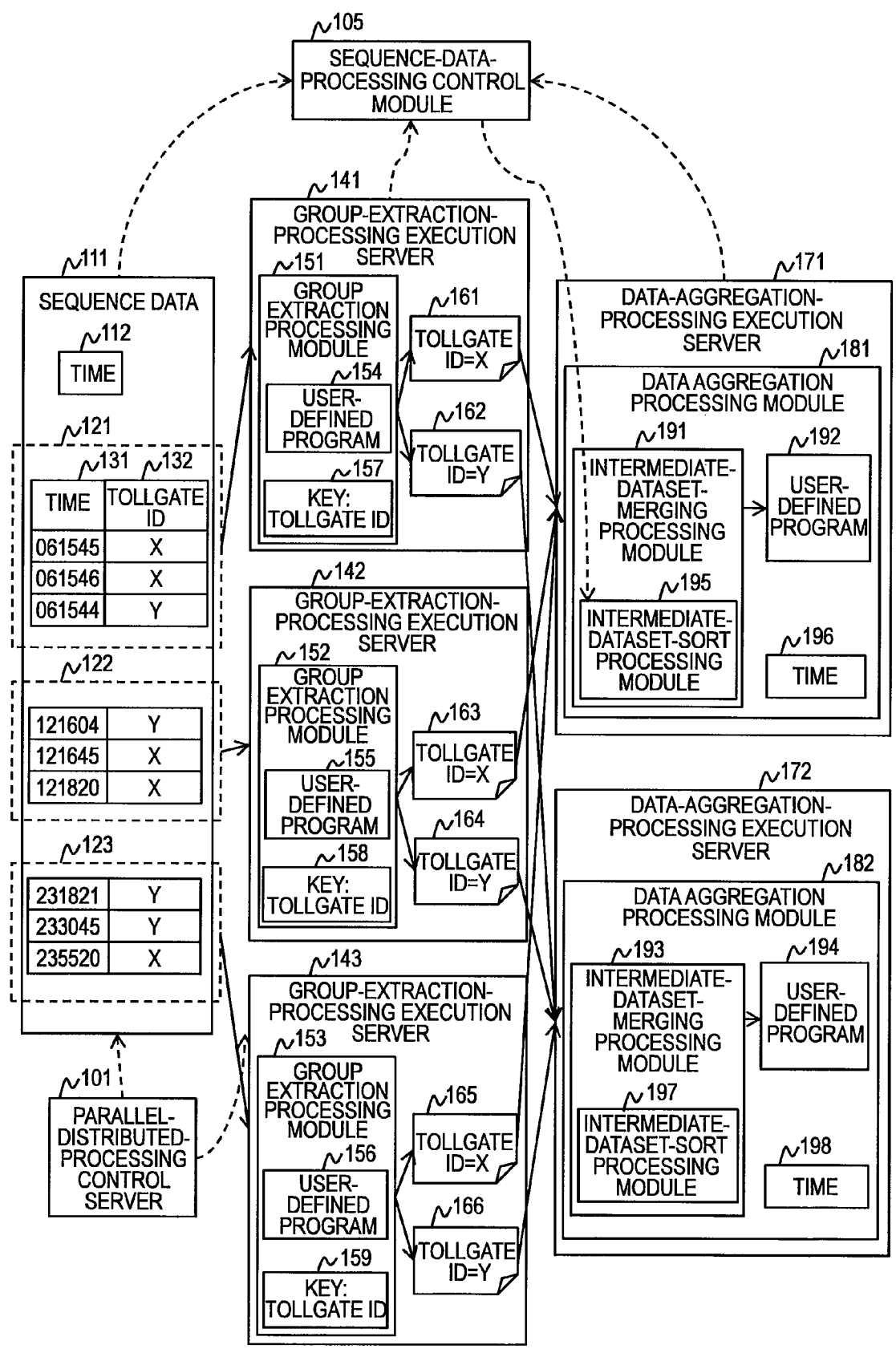
FIG. 1 is an explanatory diagram illustrating an overview of a parallel distributed processing method according to a first embodiment of this invention.

FIG. 1 is an explanatory diagram illustrating an overview of a parallel distributed processing method according to a first embodiment of this invention. The parallel distributed processing method according to this embodiment is realized by sequence data 111, a parallel-distributed-processing control server 101, a sequence-data-processing control module 105, group-extraction-processing execution servers 141, 142, and 143, and data-aggregation-processing execution servers 171 and 172.

The sequence data 111 is to be processed by the parallel distributed processing according to this embodiment. The sequence data 111 illustrated in FIG. 1 is a set of pieces of data each of which includes values set to a time 131 and a tollgate ID 132. This sequence data 111 is arranged in an order of a value of a sequence data item (time) 112.

The parallel-distributed-processing control server 101 controls the parallel distributed processing applied to the sequence data 111. Specifically, the parallel-distributed-processing control server 101 divides the sequence data 111 into a plurality of chunks of data 121, 122, and 123. Moreover, the chunks of data 121, 122, and 123 obtained through the division are respectively allocated to the group-extraction-processing execution servers 141, 142, and 143.

The group-extraction-processing execution servers 141, 142, and 143 execute group extraction processing. Specifically, group extraction processing modules 151, 152, and 153 of the respective group-extraction-processing execution servers 141, 142, and 143 group the data in the chunks of data 121, 122, and 123 respectively allocated to the group-extraction-processing execution servers 141, 142, and 143 according to values of a key (tollgate ID) defined by key definitions 157, 158, and 159 for each of the values of the key by user-defined programs 154, 155, and 156 in which a developer defines the method of the group extraction processing. As a result, the group extraction processing modules 151, 152, and 153 output, for each of the values of the key, intermediate datasets 161, 162, 163, 164, 165, and 166 in which the each value of the key and grouped data are associated with each other. In the example illustrated in FIG. 1, the values of the tollgate ID 132 contained in the chunks of data 121, 122, and 123 are any one of "X" and "Y", and the value of the key defined in the key definitions 157, 158, and 159 is the tollgate ID. As a result, the group extraction processing modules 151, 152, and 153 extract the intermediate datasets 161, 163, and 165 for the case in which the tollgate ID is "X", and the intermediate datasets 162, 164, and 166 for the case in which the value of the tollgate ID is "Y".

The data-aggregation-processing execution servers 171 and 172 carry out data aggregation processing. Specifically, data aggregation processing modules 181 and 182 acquire the intermediate datasets having the same values of the key from the group-extraction-processing execution servers 141, 142, and 143 by means of bulk transfer. In the example illustrated in FIG. 1, the data-aggregation-processing execution server 171 acquires the intermediate datasets 161, 163, and 165 having the value of key as "X". On the other hand, the data-aggregation-processing execution server 172 acquires the intermediate datasets 162, 164, and 166 having the value of key as "Y". Then, intermediate-dataset-sort processing modules 195 and 197 of the intermediate-dataset-merging processing modules 191 and 193 judge the order of the time 131, which is the sequence data item contained in the acquired intermediate datasets, and merge the intermediate datasets in the judged order. Then, user-defined programs 192 and 194 carry out aggregation processing for the data. It should be noted that the user-defined programs 192 and 194 are data aggregation processing programs in which the developer has defined the method of the data aggregation processing while it is assumed that the data is arranged in the order of time information 196 and time information 198.

It should be noted that the sequence-data-processing control module 105 controls the series of processing applied to the sequence data. Specifically, when the sequence-data-processing control module 105 judges that the sequence data 111 is data arranged in the order of the sequence data item (time) 112, each of the group-extraction-processing execution servers 141, 142, and 143 carries out the group extraction processing without assuming that the data is arranged in the order of the sequence data item 112, and the data-aggregation-processing execution servers 171 and 172 are parallel distributed processing applications for carrying out the processing while focusing on the order of the sequence data items (time) 196 and 198, the sequence-data-processing control module 105 notifies the data-aggregation-processing execution servers 171 and 172 of information on the judgment.

As described above, in the parallel distributed processing method according to this embodiment, first, the parallel-distributed-processing control server 101 divides the sequence data 111 arranged in the order of the sequence data item 112 into the plurality of chunks of data 121, 122, and 123. Then, the group-extraction-processing execution servers 141, 142, and 143, from the chunks of data 121, 122, and 123 arranged in the order of the sequence data item (time) 112, according to the values of the key defined by the key definitions (tollgate IDs) 157, 158, and 159, extract the intermediate datasets 161, 162, 163, 164, 165, and 166 for which the assumption that the data is arranged in the order of the sequence data item 112 is not made. Then, when the sequence-data-processing control module 105 judges that the sequence data 111 is data arranged in the order of the sequence data item (time) 112, each of the group-extraction-processing execution servers 141, 142, and 143 carries out the group extraction processing without assuming that the data is arranged in the order of the sequence data item 112 and the data-aggregation-processing execution servers 171 and 172 are the parallel distributed processing applications for carrying out the processing while focusing on the order of the sequence data items (time) 196 and 198, the sequence-data-processing control module 105 notifies the data-aggregation-processing execution servers 171 and 172 of the information on the judgment. Then, the data-aggregation-processing execution servers 171 and 172, focusing on the fact that, in each of the intermediate datasets 161, 162, 163, 164, 165, and 166, the data is arranged in the order of the sequence data item 112, judge the order of the sequence data items (time) 196 and 198 among the acquired intermediate datasets 161, 162, 163, 164, 165, and 166, and merge them in the judged order. Then, assuming that the data is arranged in the order of the sequence data items (time) 196 and 198, the aggregation processing is applied to the data by the user-defined programs 192 and 194.

As a result, it is no longer necessary to rearrange the data piece by piece in the order of the sequence data item (time) before the data aggregation processing or as a part of the data aggregation processing as in the conventional case. Therefore, a large quantity of sequence data can be processed at high speed efficiently.

<System Configuration>

Figure 2:
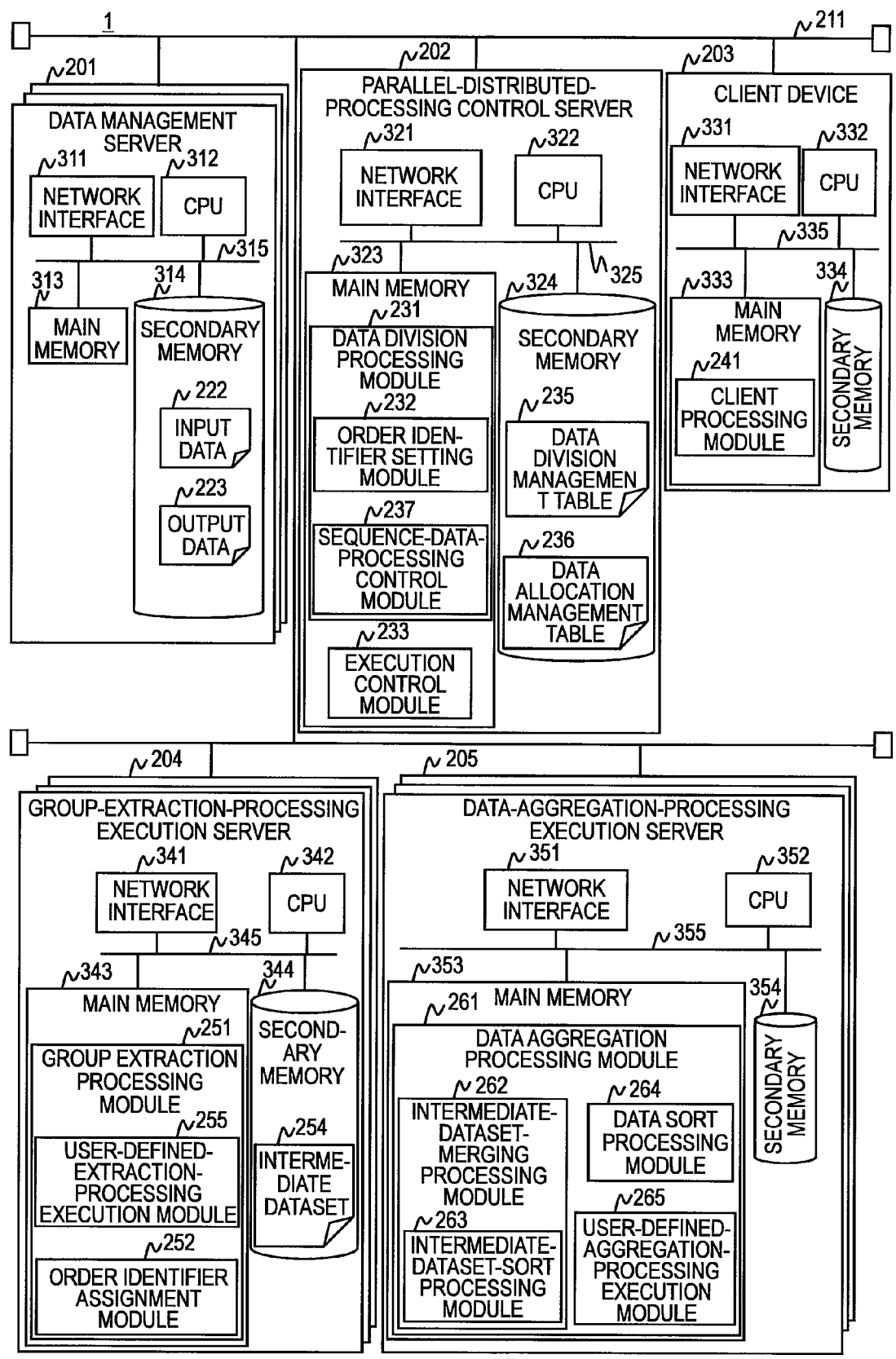
FIG. 2 is a diagram illustrating an example of a configuration of a computer system according to the first embodiment of this invention.

FIG. 2 is a diagram illustrating an example of a configuration of a computer system 1 according to the first embodiment of this invention.

The computer system 1 illustrated in FIG. 2 includes a plurality of data management servers 201, a parallel-distributed-processing control server 202, a client device 203, a plurality of group-extraction-processing execution servers 204, and a plurality of data-aggregation-processing execution servers 205, which are coupled with one another via a network 211. With this configuration, the computer system 1 carries out the above-mentioned parallel distributed processing. It should be noted that the network 211 is a local area network (LAN), a wide area network (WAN), or a global network such as the Internet. Moreover, the network 211 may be divided into a plurality of networks.

A description is given of a hardware configuration and a software configuration of each of these devices.

The data management server 201 includes a network interface 311, a CPU 312, a main memory 313, a secondary memory 314, and a bus 315 for coupling them with one another.

The network interface 311 is an interface for the data management server 201 to couple to the network 211. The CPU 312 is an arithmetic processing device for executing programs stored in the main memory 313. The main memory 313 is a memory device such as a random access memory (RAM) for storing the programs to be executed by the CPU 312 and data required for the execution of the programs. The program is, for example, an operating system (OS) (not shown). The secondary memory 314 is a magnetic memory medium such as a hard disk drive for storing input data 222 and output data 223 used for the above-mentioned parallel distributed processing. It should be noted that the secondary memory 314 may be a semiconductor memory medium such as a flash memory.

A supplement description is given of the input data 222 and the output data 223. The input data 222 and the output data 223 are logical data constituted by a plurality of pieces of physical data, and include a name and information for identifying constituent physical data. The information for identifying the physical data includes address information on the data management server 201 for storing the physical data, and a name of the physical data. An entity of the data is, as physical data, stored in the data management server 201. The input data 222 is a set of a plurality of pieces of data (sequence data) which include a plurality of data items each containing a set value, and are arranged according to a value of a sequence data item. The output data 223 is data output as a result of the above-mentioned parallel distributed processing. Specific examples of the input data 222 and the output data 223 are described later respectively referring to FIGS. 9, 12A, and 12B.

The parallel-distributed-processing control server 202 includes a network interface 321, a CPU 322, a main memory 323, a secondary memory 324, and a bus 325 for coupling them with one another.

The network interface 321 is an interface for the parallel-distributed-processing control server 202 to couple to the network 211. The CPU 322 is an arithmetic processing device for realizing predetermined functions of the parallel-distributed-processing control server 202 by executing programs stored in the main memory 323. The main memory 323 is a memory device such as a RAM for storing the programs to be executed by the CPU 322 and data required for the execution of the programs. The program is a program for realizing functions of, for example, an OS (not shown), a data division processing module 231 constituted by an order identifier setting module 232 and a sequence-data-processing control module 237, and an execution control module 233. The secondary memory 324 is a magnetic memory medium such as a hard disk drive for storing programs required by the parallel-distributed-processing control server 202 for realizing predetermined functions, and data such as a data division management table 235 and a data allocation management table 236. It should be noted that the secondary memory 324 may be a semiconductor memory medium such as a flash memory.

A supplement description is given of the data division processing module 231, the order identifier setting module 232, the execution control module 233, and the sequence-data-processing control module 237. Functions of the respective function blocks (data division processing module 231, order identifier setting module 232, execution control module 233, and sequence-data-processing control module 237) are realized by the CPU 322 executing programs for realizing the respective function blocks stored in the main memory 323. On this occasion, though operations and processing of each of the function blocks are carried out by the CPU 322, for simplicity of description, the following descriptions are given assuming that the respective function blocks operate or carry out the processing. It should be noted that the respective function blocks of the parallel-distributed-processing control server 202 may be realized by hardware including logic circuits and the like for realizing the respective functions. In this case, the respective function blocks operate or carry out the processing.

In the data division processing module 231, the order identifier setting module 232 has a function of assigning, when a parallel distributed application to be executed is the above-mentioned parallel distributed processing application, and when the input data 222 which is the sequence data is divided into chunks of data, information indicating the order of the sequence data item to the chunks of data. The processing carried out by data division processing module 231, the order identifier setting module 232, and the sequence-data-processing control module 237 are detailed later referring to FIG. 5.

The execution control module 233 has a function of transmitting an execution instruction to the group-extraction-processing execution servers 204 and the data-aggregation-processing execution servers 205, and a function of receiving the a notice of completed processing from the group-extraction-processing execution servers 204 and the data-aggregation-processing execution servers 205.

The data division management table 235 is a table that defines identification information on the data management servers 201 storing physical data constituting the divided input data 222 and data chunk identifiers assigned to chunks of data obtained through the division. A detailed description is later given of the data division management table 235 referring to FIG. 3A.

The data allocation management table 236 is a table that defines to which of the group-extraction-processing execution servers 204 a chunk of data obtained through the division is input. A detailed description is later given of the data allocation management table 236 referring to FIG. 3B.

The client device 203 includes a network interface 331, a CPU 332, a main memory 333, a secondary memory 334, and a bus 335 for coupling them with one another.

The network interface 331 is an interface for the client device 203 to couple to the network 211. The CPU 332 is an arithmetic processing device for realizing predetermined functions of the client device 203 by executing programs stored in the main memory 333. The main memory 333 is a memory device such as a RAM for storing the programs to be executed by the CPU 332 and data required for the execution of the programs. The program is a program for realizing functions of, for example, an OS (not shown) and a client processing module 241. The secondary memory 334 is a magnetic memory medium such as a hard disk drive for storing programs required by the client device 203 for realizing predetermined functions, data, and the like. It should be noted that the secondary memory 334 may be a semiconductor memory medium such as a flash memory.

The client processing module 241 requests the parallel-distributed-processing control server 202 for execution of the parallel distributed processing.

The group-extraction-processing execution server 204 includes a network interface 341, a CPU 342, a main memory 343, a secondary memory 344, and a bus 345 for coupling them with one another.

The network interface 341 is an interface for the group-extraction-processing execution server 204 to couple to the network 211. The CPU 342 is an arithmetic processing device for realizing predetermined functions of the group-extraction-processing execution server 204 by executing programs stored in the main memory 343. The main memory 343 is a memory device such as a RAM for storing the programs to be executed by the CPU 342 and data required for the execution of the programs. The program is a program for realizing functions of, for example, an OS (not shown), a group extraction processing module 251, an order identifier assignment module 252, and a user-defined-extraction-processing execution module 255. The secondary memory 344 is a magnetic memory medium such as a hard disk drive for storing programs required by the group-extraction-processing execution server 204 for realizing predetermined functions, and data such as intermediate datasets 254 to be output through the processing of the group extraction processing module 251. It should be noted that the secondary memory 344 may be a semiconductor memory medium such as a flash memory.

A supplement description is given of the group extraction processing module 251, the order identifier assignment module 252, and the user-defined-extraction-processing execution module 255. Functions of the respective function blocks (group extraction processing module 251, order identifier assignment module 252, and user-defined-extraction-processing execution module 255) are realized by the CPU 342 executing programs for realizing the respective function blocks stored in the main memory 343. On this occasion, though operations and processing of each of the function blocks are carried out by the CPU 342, for simplicity of description, the following descriptions are given assuming that the respective function blocks operate or carry out the processing. It should be noted that the respective function blocks of the group-extraction-processing execution server 204 may be realized by hardware including logic circuits and the like for realizing the respective functions. In this case, the respective function blocks operate or carry out the processing. It should be noted that a detailed description is later given of the processing carried out by the group extraction processing module 251, the order identifier assignment module 252, and a user-defined-extraction-processing execution module 255 referring to FIG. 6.

The data-aggregation-processing execution server 205 includes a network interface 351, a CPU 352, a main memory 353, a secondary memory 354, and a bus 355 for coupling them with one another.

The network interface 351 is an interface for the data-aggregation-processing execution server 205 to couple to the network 211. The CPU 352 is an arithmetic processing device for realizing predetermined functions of the data-aggregation-processing execution server 205 by executing programs stored in the main memory 353. The main memory 353 is a memory device such as a RAM for storing the programs to be executed by the CPU 352 and data required for the execution of the programs. The program is a program for realizing functions of, for example, an OS (not shown), a data aggregation processing module 261, an intermediate-dataset-merging processing module 262, an intermediate-dataset-sort processing module 263, a data sort processing module 264, and a user-defined-aggregation-processing execution module 265. The secondary memory 354 is a magnetic memory medium such as a hard disk drive for storing programs required by the data-aggregation-processing execution server 205 for realizing predetermined functions, data, and the like. It should be noted that the secondary memory 354 may be a semiconductor memory medium such as a flash memory.

A supplement description is given of the data aggregation processing module 261, the intermediate-dataset-merging processing module 262, the intermediate-dataset-sort processing module 263, the data sort processing module 264, and the user-defined-aggregation-processing execution module 265. Functions of the respective function blocks (data aggregation processing module 261, intermediate-dataset-merging processing module 262, intermediate-dataset-sort processing module 263, data sort processing module 264, and user-defined-aggregation-processing execution module 265) are realized by the CPU 352 executing programs for realizing the respective function blocks stored in the main memory 353. On this occasion, though operations and processing of each of the function blocks are carried out by the CPU 352, for simplicity of description, the following descriptions are given assuming that the respective function blocks operate or carry out the processing. It should be noted that the respective function blocks may be realized by hardware including logic circuits and the like for realizing the respective functions of the data-aggregation-processing execution server 205. In this case, the respective function blocks operate or carry out the processing. It should be noted that a detailed description is later given of the processing carried out by the data aggregation processing module 261, the intermediate-dataset-merging processing module 262, the intermediate-dataset-sort processing module 263, the data sort processing module 264, and the user-defined-aggregation-processing execution module 265 referring to FIG. 7.

Though the hardware configurations and software configurations of the respective devices have been described above, the configurations of the data management server 201, the parallel-distributed-processing control server 202, the client device 203, the group-extraction-processing execution server 204, and the data-aggregation-processing execution server 205 are not limited to the configurations illustrated in FIG. 2. For example, the data management server 201 may be constituted on the same computer on which the parallel-distributed-processing control server 202 is constituted. Moreover, the user-defined-aggregation-processing execution module 265 of the data-aggregation-processing execution server 205 may be executed on a different computer. Moreover, the data division processing module 231 and the sequence-data-processing control module 237 of the parallel-distributed-processing control server 202 may be executed on a different computer such as the client device 203.

<Contents of Tables>

A detailed description is given of the tables used for the parallel distributed processing according to the first embodiment of this invention. On this occasion, the data division management table 235 and the data allocation management table 236 stored in the parallel-distributed-processing control server 202 are described.

(Data Division Management Table 235)

FIG. 3A is a diagram illustrating an example of the data division management table 235 according to the first embodiment of this invention. The data division management table 235 is, for example, a file loaded to the main memory 323 (see FIG. 2) when the parallel distributed processing is carried out.

This data division management table 235 stores data in which a logical data ID 413, a data chunk identifier 411, and a data management server node ID 412 are associated with one another.

The logical data ID 413 is an identifier indicating the sequence data to be processed by the parallel distributed processing application, namely the input data 222. For example, a character string uniquely identifying the logic data is set. The data chunk identifier 411 is an identifier assigned to each of the chunks of data obtained through the division carried out by the parallel-distributed-processing control server 202. The data chunk identifier 411 is set, for example, based on the group-extraction-processing execution servers 204 which process the chunks of data. For example, a serial number indicating an order of the chunks of the sequence data obtained through the division, or a MAC address of the group-extraction-processing execution server 204 is set. The data management server node ID 412 is an identifier of the data management server 201 that manages the physical data constituting the chunk of the data obtained through the division. For example, a host name or address information of the data management server 201 is set.

The example illustrated in FIG. 3A indicates that for example, data indicated by a logical data ID 413 "data1" is divided into three chunks of data, and that a chunk of data indicated by a data chunk identifier 411 "T1" is constituted by physical data stored in a data management server 201 indicated by a data management server node ID 412 "Host10", and physical data stored in a data management server 201 indicated by a data management server node ID 412 "Host12".

(Data Allocation Management Table 236)

FIG. 3B is a diagram illustrating an example of the data allocation management table 236 according to the first embodiment of this invention. The data allocation management table 236 is, for example, a file loaded to the main memory 323 (see FIG. 2) when the parallel distributed processing is carried out. This data allocation management table 236 stores data in which a data chunk identifier 421 and a group-extraction-processing node ID 422 are associated with one another.

The data chunk identifier 421 is an identifier assigned to each of the chunks of data obtained through the division carried out by the parallel-distributed-processing control server 202. The data chunk identifier 421 is set, for example, based on the group-extraction-processing execution servers 204 which process the chunks of data. For example, a serial number indicating an order of the chunks of the sequence data obtained through the division, or a MAC address of the group-extraction-processing execution server 204 is set. This data chunk identifier 421 corresponds to the data chunk identifier 411 of FIG. 3A. The group-extraction-processing node ID 422 is information for identifying a group-extraction-processing execution server 204 which processes the chunk of data obtained through the division. For example, a host name or address information of the group-extraction-processing execution server 204 is set.

The example illustrated in FIG. 3B indicates that the chunks of data to which data chunk identifiers 421 "T1", "T2", and "T3" are assigned are respectively allocated to group-extraction-processing execution servers 204 indicated by group-extraction-processing node IDs 422, "Host1", "Host2", and "Host3".

The data chunk identifiers 411 and the data chunk identifiers 421 correspond to each other, and thus the respective tables illustrated in FIGS. 3A and 3B can be represented as one table. However, when these pieces of information are managed using one table, there poses a problem that, if a group-extraction-processing execution server 204 corresponding to a group-extraction-processing node ID 422 fails, the parallel distributed processing cannot be continued. Therefore, these pieces of information are preferably divided into the two tables, and are managed.

<Overall Processing Steps of Parallel Distributed Processing>

Figure 4:
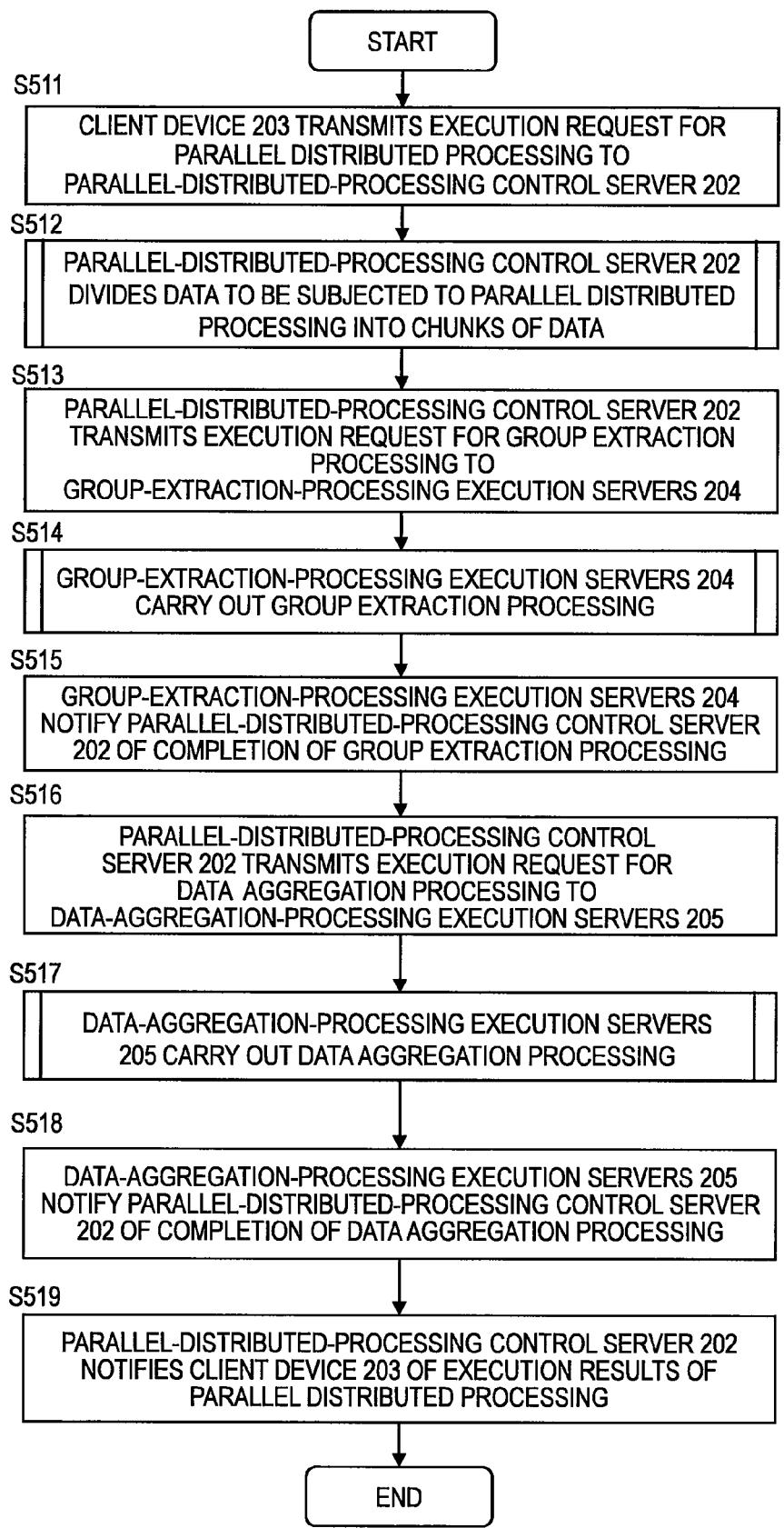
FIG. 4 is a flowchart illustrating overall processing steps of the parallel distributed processing according to the first embodiment of this invention.

FIG. 4 is a flowchart illustrating overall processing steps of the parallel distributed processing according to the first embodiment of this invention. On this occasion, a description is given of the overall processing steps of the parallel distributed processing according to this embodiment. First, in Step S511, the client device 203 transmits an execution request for the parallel distributed processing to the parallel-distributed-processing control server 202 (S511). On this occasion, the client processing module 241 of the client device 203 transmits the execution request for the parallel distributed processing to the parallel-distributed-processing control server 202. This execution request includes an identifier for application to be executed used for identifying a parallel distributed processing application to be executed this time from among of parallel distributed processing applications which can be controlled by the parallel-distributed-processing control server 202.

Then, the processing proceeds to Step S512, and the parallel-distributed-processing control server 202 divides data to be subjected to the parallel distributed processing into chunks of data (S512). On this occasion, first, the data division processing module 231 receives the execution request for the parallel distributed processing from the client device 203. Then, the data division processing module 231 judges, based on the identifier for application to be executed contained in the execution request received from the client device 203, a parallel distributed processing application to be executed this time, and identifies input data 222 to be subjected to the parallel distributed processing. The data division processing module 231 then judges whether the parallel distributed processing application to be executed this time has a characteristic that, for a large quantity of sequence data, the group extraction processing which does not assume that the sequence data is arranged in the order of a sequence data item is carried out, and then, the data aggregation processing which assumes that the data is arranged in the order of the sequence data item is carried out. When the parallel distributed processing application has this characteristic, the data division processing module 231 acquires input data 222 to be processed by the parallel distributed processing application to be executed this time from the data management server 201, and divides the input data 222 into as many chunks of data as the number of the group-extraction-processing execution servers 204. Then, the data division processing module 231 assigns successive data chunk identifiers 411 to the respective chunks of data. A detailed description is given of the processing carried out by the data division processing module 231 in Step S512 referring to FIG. 5.

A supplement description is given of Step S512. In Step S512, the input data 222 acquired by the parallel-distributed-processing control server 202 from the data management server 201 contains information for identifying physical data constituting the input data 222. Moreover, methods of judging, from the identifier for application to be executed, the parallel distributed processing application to be executed this time and the input data 222 to be processed, include a method of managing in advance information that associates an identifier of the parallel distributed application which can be controlled by the parallel-distributed-processing control server 202 and information for identifying the input data 222, and making the judgment based on the managed information.

Then, the processing proceeds to Step S513, and the parallel-distributed-processing control server 202 transmits an execution request for the group extraction processing to the group-extraction-processing execution servers 204 (S513). On this occasion, the execution control module 233 transmits the execution request for the group extraction processing to the group-extraction-processing execution servers 204. This execution request contains information required by the group-extraction-processing execution server 204 to acquire the physical data constituting the chunk of data allocated to the group-extraction-processing execution server 204. The information necessary for acquiring the physical data constituting the chunk of data is identification information on the data management server 201 and a name of the data. The execution control module 233 acquires this information based on the data management server node ID 412 in the data division management table 235 and the input data 222 acquired in Step S512.

Then, the processing proceeds to Step S514, and the group-extraction-processing execution servers 204 carry out the group extraction processing (S514). On this occasion, first, the group extraction processing module 251 receives the execution request for the group extraction processing from the parallel-distributed-processing control server 202. Then, the group extraction processing module 251 acquires, based on the information necessary for acquiring the physical data constituting the chunk of data contained in the execution request, the input data 222 from the data management server 201. Then, the group extraction processing module 251 divides, by using a user-defined program defined in advance by a developer and values of a key defined in the key definition, the acquired input data 222 into groups for the respective values of the key. Then, the group extraction processing module 251 generates, for the respective values of the key, the intermediate datasets 254 in which each value of the key and grouped data are associated with each other, and outputs the generated intermediate datasets 254. Further, the group extraction processing module 251, when a data chunk identifier is assigned to the chunk of data, assigns the data chunk identifier to the generated intermediate datasets 254. The processing carried out by the group extraction processing module 251 is later detailed referring to FIG. 6.

Then, the processing proceeds to Step S515, and the group-extraction-processing execution servers 204 notify the parallel-distributed-processing control server 202 of completion of the group extraction processing (S515). On this occasion, the group extraction processing module 251 of each of the group-extraction-processing execution servers 204 simultaneously notifies the values of the key used for the group extraction.

Then, the processing proceeds to Step S516, and the parallel-distributed-processing control server 202 transmits an execution request for the data aggregation processing to the data-aggregation-processing execution servers 205 (S516). On this occasion, when the execution control module 233 receives a notice that the processing has been completed from all the group-extraction-processing execution servers 204, the execution control module 233 transmits the execution request for the data aggregation processing to the data-aggregation-processing execution servers 205. The execution request contains the values of the key for processing allocated to the respective data-aggregation-processing execution servers 205, and the information for identifying the respective group-extraction-processing execution servers 204. The information for identifying the group-extraction-processing execution server 204 is the information acquired by the execution control module 233 by referring to the data allocation management table 236, and specifically, is the group-extraction-processing node ID 422 of FIG. 3B.

Then, the processing proceeds to Step S517, and the data-aggregation-processing execution servers 205 carry out the data aggregation processing (S517). On this occasion, first, the data aggregation processing module 261 receives the execution request for the data aggregation processing from the parallel-distributed-processing control server 202. Then, the data aggregation processing module 261, based on a value of the key allocated to the data-aggregation-processing execution server 205, and the information for identifying the group-extraction-processing execution servers 204 which are contained in the received execution request, acquires the intermediate datasets 254 having the same value of the key from all the group-extraction-processing servers 204. Then, the intermediate-dataset-merging processing module 262 judges the order of the sequence data items among the intermediate datasets 254 based on the data chunk identifiers assigned to the intermediate datasets 254, merges the intermediate datasets 254 in the judged order, and creates a list of values in which the value of the key and the groups are associated with each other. Moreover, the user-defined-aggregation-processing execution module 265 executes user-defined aggregation processing focusing on the order of the sequence data item, and stores results as output data 223 into the data management servers 201. The processing carried out by the data aggregation processing module 261 is later detailed referring to FIG. 7.

A supplement description is given of the processing carried out by the user-defined-aggregation-processing execution module 265. In this processing, physical data constituting the output data 223 is stored as well, and a name and information for identifying the constituent physical data are set to the output data 223.

Then, the processing proceeds to Step S518, and the data-aggregation-processing execution servers 205 notify the parallel-distributed-processing control server 202 of completion of the data aggregation processing (S518). On this occasion, the data-aggregation-processing execution servers 205 notify the parallel-distributed-processing control server 202 of the names of the output data 223 output in Step S517 and information for identifying the data management servers 201 storing the output data 223. The information for identifying the data management server 201 is address information, for example.

Then, the processing proceeds to Step S519, and the parallel-distributed-processing control server 202 notifies the client device 203 of execution results of the parallel distributed processing (S519). The execution results of the parallel distributed processing contain the names of the output data 223 output by the data-aggregation-processing execution servers 205 and the information for identifying the data management servers 201 storing the output data 223.

<Processing Steps of Data Division Processing Module 231>

Figure 5:
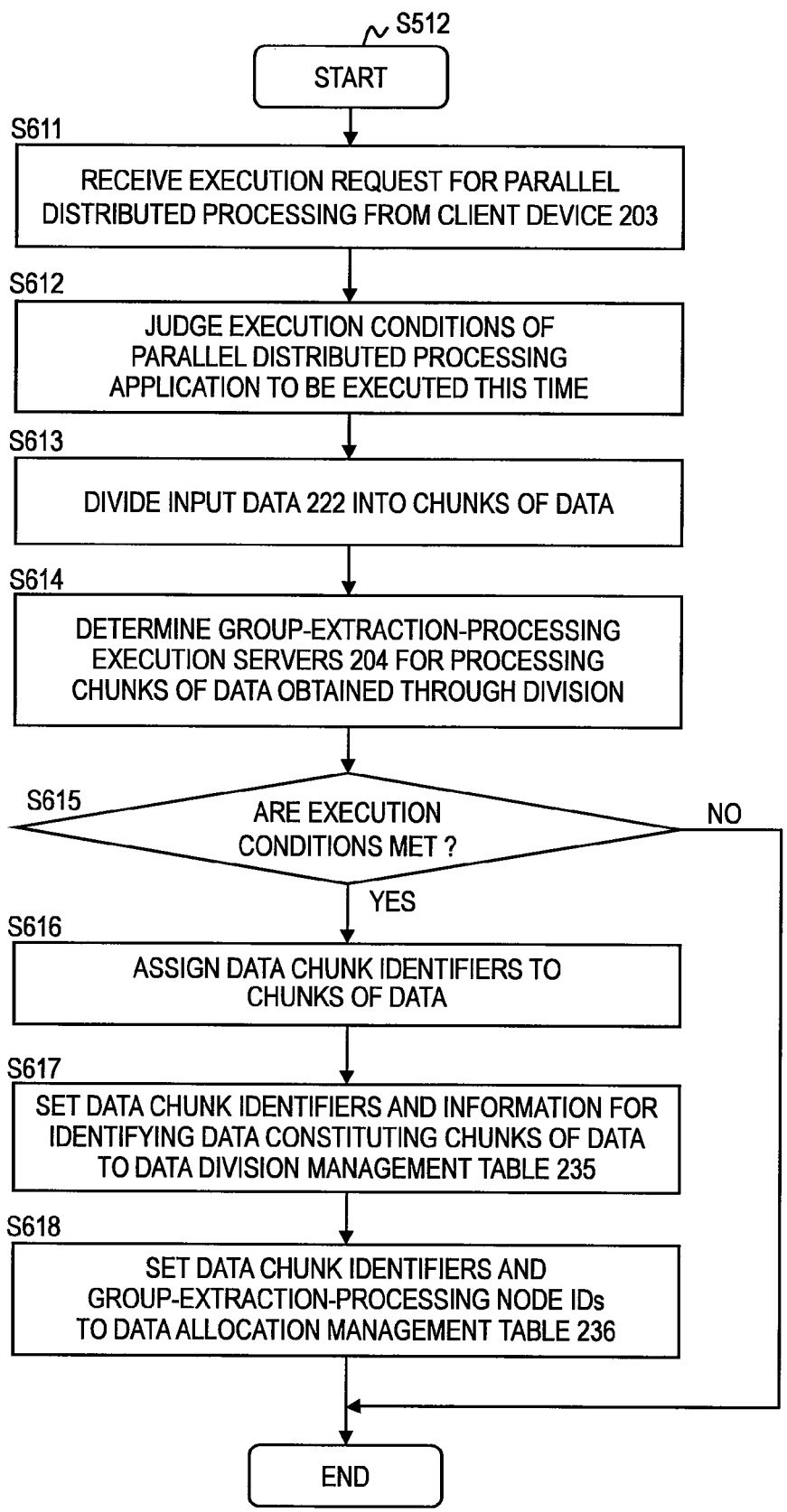
FIG. 5 is a flowchart illustrating processing steps of the data division processing module according to the first embodiment of this invention.

FIG. 5 is a flowchart illustrating processing steps of the data division processing module 231 according to the first embodiment of this invention. The processing steps illustrated in FIG. 5 correspond to Step S512 of FIG. 4.

First, in Step S611, the data division processing module 231 receives the execution request for the parallel distributed processing from the client device 203 (S611). This execution request includes the identifier for application to be executed used for identifying the parallel distributed processing application to be executed this time from among the parallel distributed processing applications which can be controlled by the parallel-distributed-processing control server 202.

Then, the data division processing module 231 proceeds to Step S612, and judges execution conditions of the parallel distributed processing application to be executed this time (S612). On this occasion, first, the sequence-data-processing control module 237 identifies, based on the identifier for application to be executed contained in the execution request received in Step S611, the parallel distributed processing application to be executed this time. Moreover, the sequence-data-processing control module 237 judges whether the identified parallel distributed processing application meets the execution conditions that, for a large quantity of sequence data, the group extraction processing which does not assume that the sequence data is arranged in the order of a sequence data item is carried out, and then, the data aggregation processing which assumes that the data is arranged in the order of the sequence data item is carried out. A result of the judgment is represented as "YES" or "NO", for example.

Methods of judging whether the parallel distributed processing application to be executed this time meets these conditions include a method of making the judgment by analyzing definition information at the time of development on the group extraction processing and the data aggregation processing executed by the parallel distributed processing application to be executed this time, and the input data 222, and a method of asking, in advance, a user to input information required for judging the execution conditions, and making the judgment based on the input information. An input interface used for inputting the information required for judging the execution conditions is described later referring to FIG. 13.

Then, the data division processing module 231 proceeds to Step S613, and divides the input data 222 into the chunks of data (S613). On this occasion, first, the data division processing module 231 identifies, based on the identifier for application to be executed acquired in Step S611, the input data 222 of the parallel distributed processing application to be executed this time. Then, the data division processing module 231 divides the input data 222, from the head of the sequence data item, into as many the chunks of data as the number of the group-extraction-processing execution servers 204.

Then, the data division processing module 231 proceeds to Step S614, and determines the group-extraction-processing execution servers 204 for processing the chunks of data obtained through the division (S614). On this occasion, the data division processing module 231 determines, for each of the chunks of data obtained through the division, the group-extraction-processing execution server 204 responsible for the group extraction processing. Methods of determining the group-extraction-processing execution servers 204 include a method of managing the group-extraction-processing execution servers 204 capable of carrying out the processing using a queue, and determining the group-extraction-processing execution servers 204 from the head of the queue, and a method of determining randomly the group-extraction-processing execution servers 204.

Then, the data division processing module 231 proceeds to Step S615. When, in Step S612, the parallel distributed processing application to be executed this time meets the above-mentioned execution conditions ("YES" in S615), the data division processing module 231 proceeds to Step S616. When the parallel distributed processing application does not meet the execution conditions ("NO" in S615), the data division processing module 231 finishes the processing.

When the data division processing module 231 proceeds to Step S616, the data division processing module 231 assigns data chunk identifiers to the chunks of data (S616). On this occasion, the order identifier setting module 232 assigns, based on the information determined in Step S614, to each of the chunks of data obtained through the division in Step S613, as a data chunk identifier for identifying each of the chunks of data, a serial number indicating the order of the division of the input data 222 from the head thereof into the plurality of chunks of data. For example, when time-series data having a time as the sequence data item is divided into a plurality of chunks of data, serial numbers are assigned to the chunks of data in an order of the time of the data.

Then, the data division processing module 231 proceeds to Step S617, and sets the data chunk identifiers and the information for identifying data constituting the chunks of data, to which the data chunk identifiers are assigned, to the data division management table 235 (S617). On this occasion, the order identifier setting module 232 sets the data chunk identifiers assigned to the chunks of data in Step S616, and the information for identifying the data constituting the chunks of data, to which the data chunk identifiers are assigned, to the data division management table 235.

Then, the data division processing module 231 proceeds to Step S618, and sets the data chunk identifiers and group-extraction-processing node IDs to the data allocation management table 236 (S618). On this occasion, the order identifier setting module 232 sets the data chunk identifiers assigned to the chunks of data in Step S616 and the node IDs of the group-extraction-processing execution servers 204 determined to process the chunks of data in Step S614 to the data allocation management table 236.

<Processing Steps of Group Extraction Processing Module 251>

Figure 6:
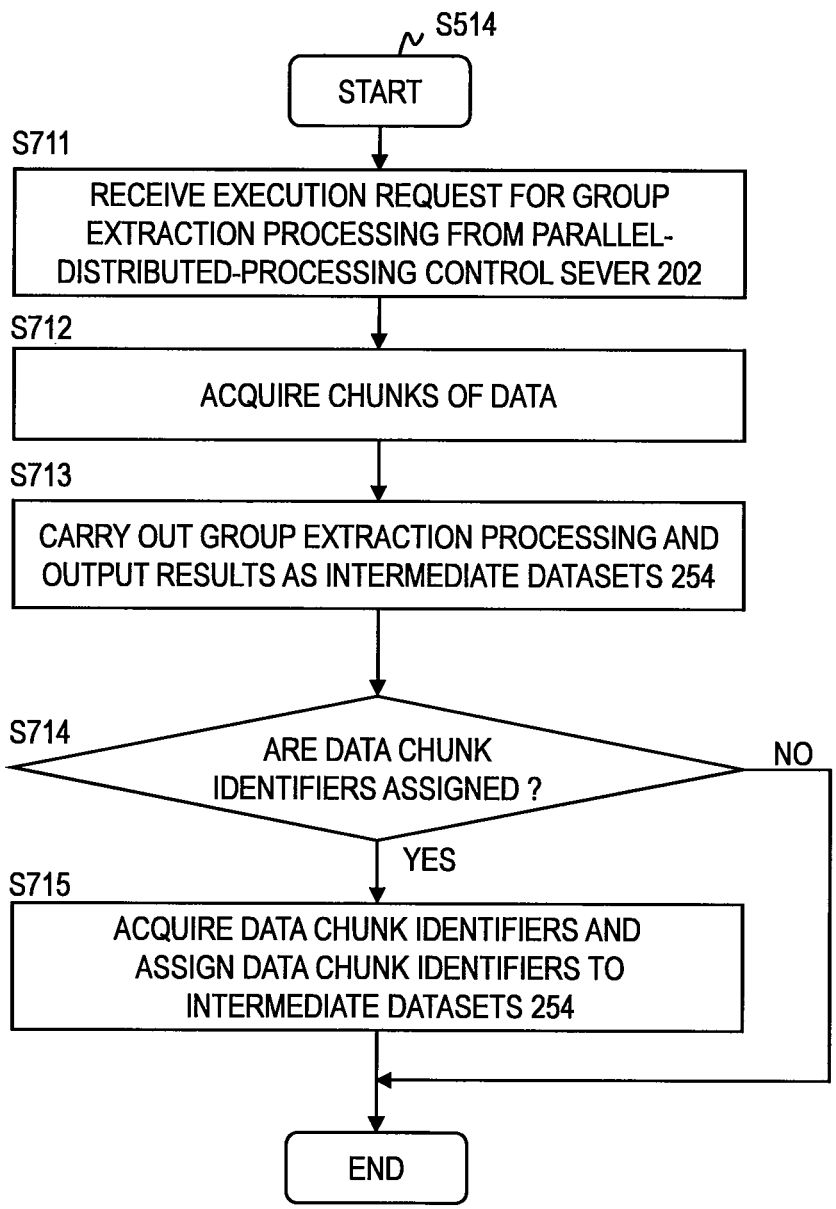
FIG. 6 is a flowchart illustrating processing steps of the group extraction processing module according to the first embodiment of this invention.

FIG. 6 is a flowchart illustrating processing steps of the group extraction processing module 251 according to the first embodiment of this invention. The processing steps illustrated in FIG. 6 correspond to Step S514 of FIG. 4.

First, in Step S711, the group extraction processing module 251 receives the execution request for the group extraction processing from the parallel-distributed-processing control server 202 (S711). On this occasion, the group extraction processing module 251, after the reception of the execution request, acquires, from this execution request, the information for identifying the physical data constituting the chunk of data allocated to the group-extraction-processing execution server 204. The information for identifying the physical data constituting the chunk of data is the identification information of the data management server 201 and the name of the data. This information is information acquired by the execution control module 233, based on the data management server node ID 412 in the data division management table 235 and the input data 222 acquired in Step S512 of FIG. 4.

Then, the group extraction processing module 251 proceeds to Step S712, and acquires the chunk of data (S712). On this occasion, the group extraction processing module 251, based on the information for identifying the physical data constituting the chunk of data acquired in Step S711, acquires the chunk of data from the data management server 201.

Then, the group extraction processing module 251 proceeds to Step S713, and carries out the group extraction processing with respect to the chunk of data acquired in Step S712, and outputs results thereof as intermediate datasets 254 (S713). On this occasion, the user-defined-extraction-processing execution module 255 groups, by using a user-defined program defined in advance by a developer and the values of the key defined in the key definition, the chunk of data acquired in Step S712 for the each of the values of the key. Then, the user-defined-extraction-processing execution module 255 outputs, for each of the values of the key, the value of the key and the grouped data associated therewith as the intermediate datasets 254.

For example, the chunk of data to which the group extraction processing is applied includes 100 types of the data item corresponding to the tollgate ID, and the key definition indicates that the values of the key are tollgate IDs. On this occasion, one group-extraction-processing execution server 204 outputs as many intermediate datasets 254 as the number of types of the data item corresponding to the tollgate ID, namely 100 intermediate datasets 254.

A supplement description is given of Step S713. In Step S713, further, the user-defined-extraction-processing execution module 255 assigns the values of the key to the intermediate datasets 254. Methods of assigning the values of the key to the intermediate datasets 254 include a method of adding the value of the key to the head of the data of each of the intermediate datasets 254 and a method of adding the value of the key to a name of each of the intermediate datasets 254.

Then, the group extraction processing module 251 proceeds to Step S714, and judges whether or not a data chunk identifier is assigned (S714). On this occasion, the group extraction processing module 251 judges whether or not, to the chunk of data acquired in Step S712, a data chunk identifier is assigned. When a data chunk identifier is assigned ("YES" in S714), the group extraction processing module 251 proceeds to Step S715. When a data chunk identifier is not assigned ("NO" in S714), the group extraction processing module 251 finishes the processing.

When the group extraction processing module 251 proceeds to Step S715, the group extraction processing module 251 acquires the data chunk identifier, and assigns the data chunk identifier to the intermediate datasets 254 (S715). On this occasion, the order identifier assignment module 252 acquires the data chunk identifier assigned to the chunk of data acquired in Step S712, and assigns the acquired data chunk identifier to the intermediate datasets 254 generated in Step S713. Methods of assigning the data chunk identifier to the intermediate datasets 254 include a method of adding the data chunk identifier to the head of the data of the intermediate datasets 254 and a method of adding the data chunk identifier to the name of the intermediate datasets 254.

<Processing Steps of Data Aggregation Processing Module 261>

Figure 7:
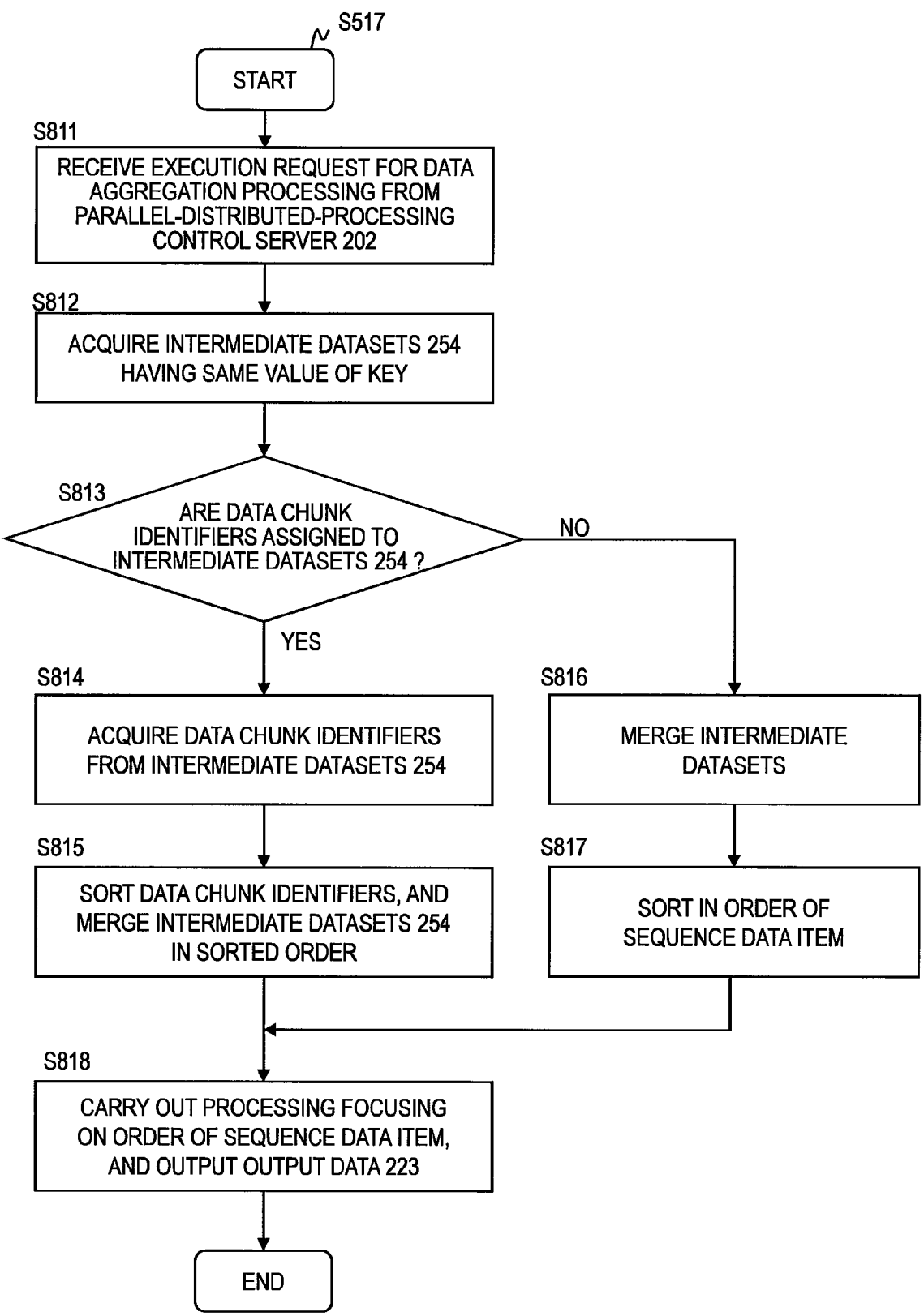
FIG. 7 is a flowchart illustrating processing steps of the data aggregation processing module according to the first embodiment of this invention.

FIG. 7 is a flowchart illustrating processing steps of the data aggregation processing module 261 according to the first embodiment of this invention. The processing steps illustrated in FIG. 7 correspond to Step S517 of FIG. 4.

First, in Step S811, the data aggregation processing module 261 receives the execution request for the data aggregation processing from the parallel-distributed-processing control server 202 (S811). The execution request contains the value of the key for which processing is allocated to the data-aggregation-processing execution server 205, and the information for identifying the group-extraction-processing execution servers 204 containing the intermediate datasets 254. The information for identifying the group-extraction-processing execution server 204 is the information acquired by the execution control module 233 by referring to the data allocation management table 236, and specifically, is the group-extraction-processing node ID 422 of FIG. 3B.

Then, the data aggregation processing module 261 proceeds to Step S812, and acquires the intermediate datasets 254 having the same value of the key (S812). On this occasion, the data aggregation processing module 261, based on the information contained in the execution request received in Step S811, makes access to the respective group-extraction-processing execution servers 204, and acquires all the intermediate datasets 254 having the same value of the key by means of bulk transfer. Methods of judging intermediate datasets 254 having the same value of the key include a method of making the judgment based on data contained in the intermediate datasets 254 output in Step S713, and a method of making the judgment based on the names of the intermediate datasets.

Then, the data aggregation processing module 261 proceeds to Step S813, and judges whether data chunk identifiers are assigned to the intermediate datasets 254 acquired in Step S812 (S813). When data chunk identifiers are assigned ("YES" in Step S813), the data aggregation processing module 261 proceeds to Step S814. On the other hand, when data chunk identifiers are not assigned ("NO" in Step S813), the data aggregation processing module 261 proceeds to Step S816.

When the data aggregation processing module 261 proceeds to Step S814, the data aggregation processing module 261 acquires the data chunk identifiers from the intermediate datasets 254 acquired in Step S812 (S814). On this occasion, the intermediate-dataset-merging processing module 262 acquires the data chunk identifiers such as serial numbers assigned to the intermediate datasets 254 acquired in Step S812.

Then, the data aggregation processing module 261 proceeds to Step S815, sorts the data chunk identifiers, and merges the intermediate datasets 254 in the sorted order (S815). On this occasion, the intermediate-dataset-sort processing module 263 sorts the data chunk identifiers acquired in Step S814 by the number, and merges the intermediate datasets 254 in the sorted order. Methods of sorting the data chunk identifiers by the number include a general sort method such as the Quicksort.

On the other hand, when the data aggregation processing module 261 proceeds to Step S816, the data aggregation processing module 261 merges the intermediate datasets 254 acquired in Step S812 (S816). On this occasion, the intermediate-dataset-merging processing module 262 merges the intermediate datasets 254 in the order or acquisition, and generates a list of values that associates the values of the key and the groups with each other.

Then, the data aggregation processing module 261 proceeds to Step S817, and sorts the data in the order of the sequence data item (S817). On this occasion, the data sort processing module 264 rearrange the data in the list generated in Step S816 in the order of the sequence data item piece by piece.

The data aggregation processing module 261 proceeds to Step S818, carries out processing focusing on the order of the sequence data item, and outputs the output data 223 (S818). On this occasion, the user-defined-aggregation-processing execution module 265 applies, to the data generated in Step S815 or S817, the processing according to the processing method defined by a developer and utilizing the order of the sequence data item, and stores results as the output data 223 in the data management servers 201.

<Specific Example of Parallel Distributed Processing>

A description is given of a specific example of the parallel distributed processing according the first embodiment of this invention. In this specific example, when the parallel distributed processing method according to this embodiment is applied to the above-mentioned traffic data analysis system of motor vehicles, a specific operation of an analysis application for analyzing the customer attributes per unit time relating to the motor vehicles that have exited from the respective tollgates and data to be used are described.

The traffic data analysis system according to the specific example includes three group-extraction-processing execution servers 204 and two data-aggregation-processing execution servers 205. Moreover, to the tollgate identifiers of the traffic data, information on any one of two tollgates "X" and "Y" is set.

This analysis application first groups the traffic data input as the input data 222 for each of the tollgates, and outputs a list of traffic data on exits at each of the tollgates as the output data. Then, the analysis application receives, as input data, the list of traffic data on the exits at each of the tollgates, carries out the processing of extracting the customer attributes per unit time relating to the motor vehicles that have exited from each of the tollgates, and outputs results thereof as the output data 223.

(Processing Steps of Traffic Data Analysis System in Specific Example)

Figure 8:
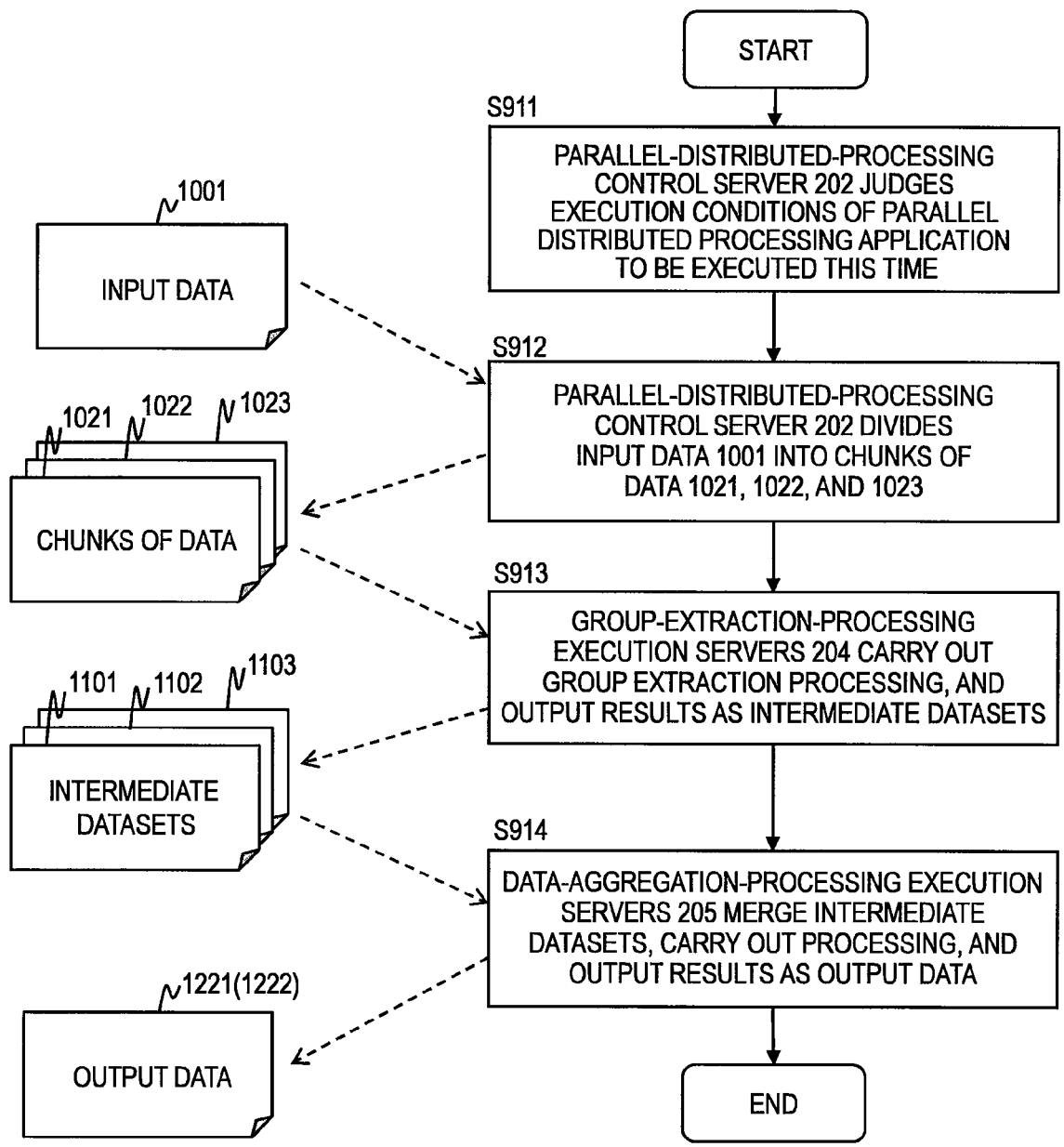
FIG. 8 is a flowchart illustrating the processing steps of the traffic data analysis system according to the first embodiment of this invention.

FIG. 8 is a flowchart illustrating the processing steps of the traffic data analysis system according to the first embodiment of this invention.

First, in Step S911, the parallel-distributed-processing control server 202 judges the execution conditions of the parallel distributed processing application to be executed this time (S911). On this occasion, the data division processing module 231 of the parallel-distributed-processing control server 202 receives an execution request for the parallel distributed processing from the client device 203, and, based on the received execution request, identifies the parallel distributed processing application to be executed this time. Then, the data division processing module 231 judges the execution conditions of the identified parallel distributed processing application. The processing in Step S911 corresponds to the processing in Steps S611 and S612 of FIG. 5.

In other words, the data division processing module 231 judges whether the identified parallel distributed processing application meets the execution conditions that, for a large quantity of sequence data, the group extraction processing which does not assume that the sequence data is arranged in the order of a sequence data item is carried out, and then, the data aggregation processing which assumes that the data is arranged in the order of the sequence data item is carried out.

The analysis application according to this specific example out the group extraction processing of grouping a large quantity of the traffic data according to each of the values of the data item (tollgate ID) different from the sequence data item (time), and then carries out the data aggregation processing focusing on the order of the sequence data item (time). Thus, the analysis application meets the execution conditions.

Then, the processing proceeds to Step S912, and the parallel-distributed-processing control server 202 divides input data 1001 into chunks of data 1021, 1022, and 1023 (S912). On this occasion, the data division processing module 231 of the parallel-distributed-processing control server 202 divides the input data 1001 into the three chunks of data 1021, 1022, and 1023 as many as the number of the group-extraction-processing execution servers 204. The processing in Step S912 corresponds to the processing in Steps S613 to S618 of FIG. 5. A description is given of an example of the data relating to the processing in Step S912 referring to FIG. 9.

Figure 9:
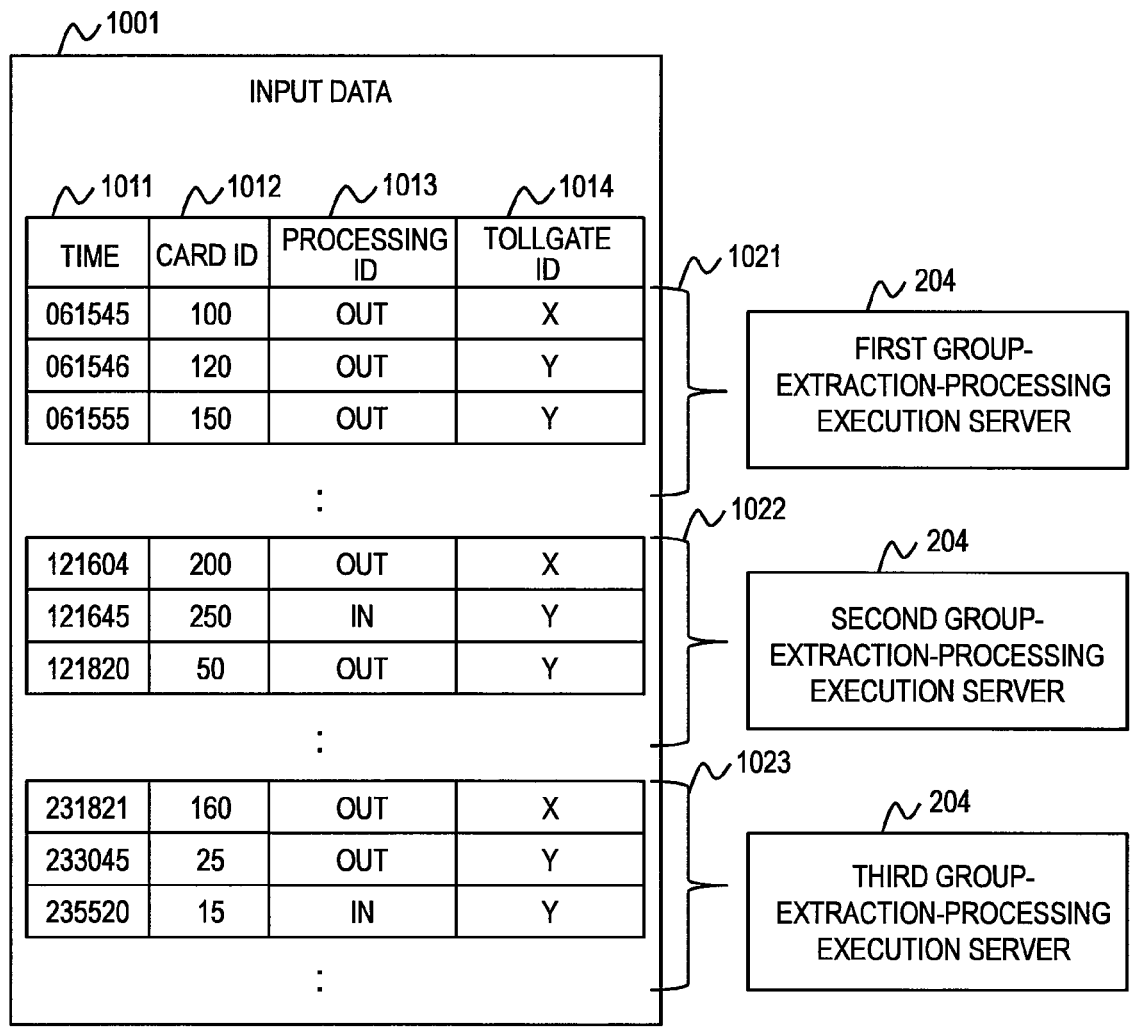
FIG. 9 is a diagram illustrating an example of the input data and the chunks of data of the traffic data analysis system according to the first embodiment of this invention.

FIG. 9 is a diagram illustrating an example of the input data 1001 and the chunks of data 1021, 1022, and 1023 of the traffic data analysis system according to the first embodiment of this invention.

As illustrated in FIG. 9, physical data constituting the input data 1001 includes time information 1011, card IDs 1012, processing IDs 1013, and tollgate IDs 1014. The time information 1011 is information on a time at which a motor vehicle passes a tollgate. The card ID 1012 is an identifier of an IC card installed on the motor vehicle. The processing ID 1013 is a traffic identifier indicating any one of the entry and exit. The tollgate ID 1014 is an identifier of the tollgate.

In Step S912, the data division processing module 231 divides the physical data constituting the input data 1001 illustrated in FIG. 9 into the three chunks of data 1021, 1022, and 1023 as many as the number of the group-extraction-processing execution servers 204. Each of the chunks of data 1021, 1022, and 1023 contains a large quantity of the traffic data. These chunks of data 1021, 1022, and 1023 constitute the input data to the first to third group-extraction-processing execution servers 204.

A supplement description is given of Step S912. In this specific example, the data division processing module 231 divides the input data into the chunks of data 1021, 1022, and 1023 as described above, and then, determines the first to third group-extraction-processing execution servers 204 responsible for processing the chunks of data 1021, 1022, and 1023 obtained through the division (S614 of FIG. 5). Then, the parallel distributed processing application meets the execution conditions ("YES" in S615 of FIG. 5), and thus the data division processing module 231 assigns sequential data chunk identifiers "T1", "T2", and "T3" to the chunks of data 1021, 1022, and 1023 (S616 of FIG. 5). Then, the data division processing module 231 sets the data chunk identifiers and the information for identifying the data constituting the chunks of data to the data division management table 235 (S617 of FIG. 5). Further, the data division processing module 231 sets the data chunk identifiers and the group-extraction-processing execution node IDs to the data allocation management table 236 (S618 in FIG. 5).

Then, the processing proceeds to Step S913, and the group-extraction-processing execution servers 204 carry out the group extraction processing directed to the chunks of data 1021, 1022, and 1023 obtained through the division in Step S912, and output results thereof as intermediate datasets 254 (S913). The processing in Step S913 corresponds to the processing in Steps S711 to S715 of FIG. 6.

In other words, the group extraction processing module 251 of each of the group-extraction-processing execution servers 204 acquires, out of the chunks of data 1021, 1022, and 1023 obtained through the division in Step S912, a chunk of data allocated to the own device, and forms groups respectively for the values of the key (tollgate) from the acquired chunk of data. Then, the group extraction processing module 251 generates and outputs the intermediate datasets respectively for the values of the key (tollgate).

A supplement description is given of Step S913. In this specific example, the group extraction processing module 251 generates the intermediate datasets as described above, and then, judges whether or not a data chunk identifier is assigned to the chunk of data allocated to the own device (S713 of FIG. 6). In this specific example, the data chunk identifiers are respectively assigned to the chunks of data ("YES" in S714 of FIG. 6). Therefore, the group extraction processing module 251 assigns the data chunk identifier to the generated intermediate datasets (S715 of FIG. 6). A description is given of an example of the data relating to the processing in Step S913 referring to FIGS. 10A to 10C.

FIGS. 10A, 10B, and 10C illustrate an example of the intermediate datasets of the traffic data analysis system according to the first embodiment of this invention.

As illustrated in FIG. 10A, an intermediate dataset 1101 output from the first group-extraction-processing execution server 204 contains an intermediate dataset 1111 for the tollgate "Y" and an intermediate dataset 1112 for the tollgate "X". The intermediate datasets 1111 and 1112 contain the tollgate IDs 1014, the time information 1011, the card IDs 1012, the processing IDs 1013, and the dataset identifier "T1".

As illustrated in FIG. 10B, an intermediate dataset 1102 output from the second group-extraction-processing execution server 204 contains an intermediate dataset 1113 for the tollgate "Y" and an intermediate dataset 1114 for the tollgate "X". The intermediate datasets 1113 and 1114 contain the tollgate IDs 1014, the time information 1011, the card IDs 1012, the processing IDs 1013, and the dataset identifier "T2".

As illustrated in FIG. 10C, an intermediate dataset 1103 output from the third group-extraction-processing execution server 204 contains an intermediate dataset 1115 for the tollgate "Y" and an intermediate dataset 1116 for the tollgate "X". The intermediate datasets 1115 and 1116 contain the tollgate IDs 1014, the time information 1011, the card IDs 1012, the processing IDs 1013, and the dataset identifier "T3".

As described above, in Step S913, the group extraction processing modules 251 of three of the first to third group-extraction-processing execution servers 204 operate in parallel. As a result, the one group-extraction-processing execution server 204 outputs the two intermediate datasets relating to the tollgates "X" and "Y", and thus the three group-extraction-processing execution servers 204 output a total of six intermediate datasets.

Then, the processing proceeds to Step S914, and the data-aggregation-processing execution servers 205 carry out the processing of merging the intermediate datasets, and output results thereof as output data (S914). The processing in Step S914 corresponds to the processing in Steps S811 to S815 and S818 of FIG. 7.

In other words, the data aggregation processing module 261 of each of the data-aggregation-processing execution servers 205 receives the execution request for the data aggregation processing from the parallel-distributed-processing control server 202 (S811 of FIG. 7). Then, the data aggregation processing module 261 acquires the intermediate datasets having the same value of the key (S812 of FIG. 7). On this occasion, the data chunk identifiers are assigned to the acquired intermediate datasets ("YES" in S813 of FIG. 7). Therefore, the data aggregation processing module 261 acquires the data chunk identifiers from the intermediate datasets (S814 of FIG. 7). Then, the data aggregation processing module 261 sorts the acquired data chunk identifiers, and merges the intermediate datasets in the sorted order (S815 of FIG. 7). Then, the user-defined-aggregation-processing execution module 265 analyzes, based on the merged data, the customer attributes per unit time, and output results of the analysis as the output data (S818 of FIG. 7).

As described above, in Step S914, the data aggregation processing modules 261 of the two data-aggregation-processing execution servers 205 operate in parallel. As a result, data 1211 obtained by merging the intermediate datasets for the tollgate "Y" and data 1212 obtained by merging the intermediate datasets for the tollgate "X" are generated. Moreover, the user-defined-aggregation-processing execution module 265 carries out the processing directed to the data 1211 and 1212, and outputs results thereof as output data 1221 and 1222. A description is given of an example of the data relating to the processing in Step S914 referring to FIGS. 11A and 11B and FIGS. 12A and 12B.

FIGS. 11A and 11B illustrate examples of the data 1211 and 1212 obtained by merging the intermediate datasets of the traffic data analysis system according to the first embodiment of this invention.

The data 1211 illustrated in FIG. 11A is obtained by merging the intermediate datasets for the tollgate ID "Y". The data 1211 contains the tollgate IDs 1014, the time information 1011, the card IDs 1012, and the processing IDs 1013. On the other hand, the data 1212 illustrated in FIG. 11B is obtained by merging the intermediate datasets for the tollgate ID "X". The data 1212 contains the tollgate IDs 1014, the time information 1011, the card IDs 1012, and the processing IDs 1013.

FIGS. 12A and 12B illustrate examples of the output data 1221 and 1222 of the traffic data analysis system according to the first embodiment of this invention.

The output data 1221 illustrated in FIG. 12A is obtained by the analysis for the tollgate "Y" based on the data 1211 illustrated in FIG. 11A. The output data 1221 contains data on the tollgate IDs 1014, time intervals 1231, male ratios 1232, and average ages 1233. On the other hand, the output data 1222 illustrated in FIG. 12B is obtained by the analysis for the tollgate "X" based on the data 1212 illustrated in FIG. 11B. The output data 1222 contains data on the tollgate IDs 1014, the time intervals 1231, the male ratios 1232, and the average ages 1233.

<Effects>

As described above, according to the first embodiment of this invention, the overall processing of the parallel distributed processing application which carries out, for a large quantity of sequence data, the group extraction processing which does not assume that the sequence data is arranged in the order of a sequence data item, and then, the data aggregation processing which assumes that the data is arranged in the order of the sequence data item, can be efficiently carried out.

Specifically, when it is judged that a parallel distributed processing application has those characteristics, at the time of dividing sequence data into a plurality of chunks of data, data chunk identifiers representing serial numbers are assigned to the chunks of data obtained through the division, the group extraction processing module 251 assigns data chunk identifiers to the intermediate datasets, and the data aggregation processing module 261 merges the intermediate datasets in the order of the data chunk identifier, thereby carrying out processing based on the order of the sequence data item. As a result, the parallel distributed processing application can be carried out more efficiently compared with a conventional case.

For example, as the above-mentioned traffic data analysis system, when the sequence data item (time) and the key (tollgate ID) used for the group extraction processing are different from each other, and when, in the data aggregation processing, the processing focusing on the order of the sequence data item (time) is carried out, the customer attributes per unit time for the exit from the each tollgate can be analyzed faster than the conventional case. As a result, supports for decision making in business can be carried out faster than the conventional case.

<Input Interface>

FIG. 13 illustrates an example of the input interface used for inputting the information necessary for judging the execution conditions of the parallel distributed processing application according to the first embodiment of this invention. On this occasion, the interface for inputting information necessary for judging the execution conditions, which is described in Step S612 of FIG. 5, is described.

A parallel-distributed-processing-application setting screen 1711 illustrated in FIG. 13 includes an input field 1721 for defining a sequence data item of input data, an input field 1722 for defining a data item used as a key for the data extraction processing, and an input field 1723 for defining a data item used for the data aggregation processing.

Through this parallel-distributed-application setting screen 1711, the user inputs the information in the input fields 1721, 1722, and 1723. As a result, from the information defined on this input interface, information for defining sequence data processing control is generated, and is used in Step S612 of FIG. 5 by the parallel-distributed-processing control server 202.

This input interface is operated on any one of the devices illustrated in FIG. 2. Moreover, the information for defining sequence data processing control input via the input interface is stored at a location to be referred by the sequence-data-processing control module 237.

Though FIG. 13 illustrates the input interface by means of a graphic user interface (GUI), the input interface is not limited to the GUI. For example, the user may directly set the information for defining the sequence data processing control.

<Another Example of Processing Steps of Group Extraction Processing Module 251>

According to the above-mentioned first embodiment as in Step S613 of FIG. 5, the data division processing module 231 divides the input data 222 from the head into the chunks of data as many as the number of the group-extraction-processing execution servers 204, and the chunks of data obtained through the division are allocated to the group-extraction-processing execution servers 204. As a result, depending on the data management server 201 for storing the input data 222, even when there is a group-extraction-processing execution server 204 located closer thereto on the network, a chunk of data may be allocated to a group-extraction-processing execution server 204 located farther on the network. When a large quantity of data is transferred, by allocating the processing to a closer group-extraction-processing execution server 204 on the network, the speed of the processing increases.

Thus, in Step S613 of FIG. 5, when the data division processing module 231 divides the input data 222 into chunks of data, the division is preferably carried out by the following method. Specifically, in this method, the input data 222 is divided, and the plurality of chunks of data obtained through the division are allocated to the group extraction execution server 204 so that a group-extraction-processing execution server 204 closest, on the network, to the data management server 201 storing the input data 222 can process the input data 222. The group-extraction-processing execution server 204 to which the plurality of chunks of data obtained through the division are allocated processes the plurality of chunks of data.

Methods of identifying a group-extraction-processing execution server 204 closest to the data management server 201 on the network include a method of making the judgment according to the hop number from the data management server 201 to the group-extraction-processing execution server 204.

FIG. 14 is a flowchart illustrating the processing steps when the group-extraction-processing module 251 according to the first embodiment of this invention processes a plurality of chunks of data as the input data.

In the flowchart illustrated in FIG. 14, to the respective steps of processing illustrated in FIG. 6, processing from Step S1311 to Step S1316 is newly added. Moreover, out of the processing illustrated in FIG. 6, Step S715 is removed. It should be noted that the processing from Step S711 to Step S714 of FIG. 14 is the same as the processing from Step S711 to Step S714 of FIG. 6, and a description thereof is thus omitted. A description is given of the processing from Step S1311 to Step S1316 of FIG. 14.

When the group-extraction-processing module 251 proceeds to Step S1311, the group-extraction-processing module 251 acquires the data chunk identifiers assigned to all the chunks of data acquired in Step S712 (S1311). On this occasion, the order identifier assignment module 252 acquires the data chunk identifiers assigned to all the data chunks acquired in Step S712.

Then, the group extraction processing module 251 proceeds to Step S1312, and judges, for all the acquired data chunk identifiers, whether or not values thereof have continuity (S1312). On this occasion, the order identifier assignment module 252 refers to all the data chunk identifiers acquired in Step S1311, and judges whether or not all the acquired data chunk identifiers (such as serial numbers) have at least partial continuity of the value. When there is the continuity of the value in at least a part of the data chunk identifiers, and the number of the data chunk identifiers is two or more ("YES" in S1312), the group extraction processing module 251 proceeds to Step S1313. On the other hand, when there is no continuity of the value in all the acquired data chunk identifiers ("NO" in S1312), the group extraction processing module 251 proceeds to Step S1315.

On this occasion, the case in which there is the continuity of the value in at least a part of the data chunk identifiers is, for example, a case in which data chunk identifiers assigned to three data chunks are "T1", "T2", and "T4", and thus a part of the values of the data chunk identifiers, "T1" and "T2", are continuous. On the other hand, the case in which there is no continuity of the value in the data chunk identifiers is, for example, a case in which the data chunk identifiers are "T1", "T3", and "T5".

When the group extraction processing module 251 proceeds to Step S1313, the group extraction processing module 251 merges chunks of data to which continuous data chunk identifiers are assigned, and output the merged chunks of data as an intermediate dataset 254 (S1313). On this occasion, the order identifier assignment module 252 collects continuous data chunk identifiers, merges chunks of data to which the continuous data chunk identifiers are assigned in the order of the data chunk identifier, carries out the processing defined by the developer, and outputs intermediate datasets 254 respectively for values of the key. For chunks of data to which discontinuous data chunk identifiers are assigned, intermediate datasets are output respectively for the values of the key. For example, when data chunk identifiers are "T1", "T2", and "T4", chunks of data to which the data chunk identifiers "T1" and "T2" are assigned are merged, and intermediate datasets are output respectively for the values of the key. Moreover, for the chunk of data to which the data chunk identifier "T4" is assigned, intermediate datasets are output respectively for the values of the key.

Then, the group extraction processing module 251 proceeds to Step S1314, and assigns the data chunk identifiers to the output intermediate datasets 254 (S1314). On this occasion, the order identifier assignment module 252 assigns, to the intermediate datasets 254 output in Step S1313, the data chunk identifiers acquired in Step S1311. In doing so, the order identifier assignment module 252 assigns, to the intermediate dataset generated by merging the chunks of data having continuity of the value of the data chunk identifiers, information acquired by concatenating the data chunk identifiers as a new data chunk identifier. On the other hand, the order identifier assignment module 252 assigns, to the intermediate dataset generated based on the chunk of data having discontinuous value of the data chunk identifier, the data chunk identifier acquired from this chunk of data in Step S1313 without any change. For example, when data chunk identifiers are "T1" and "T2", to an intermediate dataset generated by merging chunks of data to which the data chunk identifiers "T1" and "T2" are assigned, a data chunk identifier "T1T2" is assigned.

On the other hand, when the group extraction processing module 251 proceeds to Step S1315, the group extraction processing module 251 outputs intermediate datasets 254 (S1315). On this occasion, the order identifier assignment module 252 applies, to all the chunks of data acquired in Step S712, the processing defined by the developer, and outputs intermediate datasets respectively for the values of the key. For example, when two chunks of data are acquired in Step S712, and three values of the key are contained in the two chunks of data, six intermediate datasets are output.

Then, the group extraction processing module 251 proceeds to Step S1316, and assigns the data chunk identifiers to the output intermediate datasets 254 (S1316). On this occasion, the order identifier assignment module 252 assigns, to all the intermediate datasets output in Step S1315, the data chunk identifiers acquired in Step S1311.

When the processing illustrated in FIG. 14 is finished, the intermediate-dataset-sort processing module 263 of the data-aggregation-processing execution server 205 sorts the data chunk identifiers (including the data chunk identifiers obtained by the concatenation) assigned to all the intermediate datasets, and merges the intermediate datasets in the sorted order. Then, the user-defined-aggregation-processing execution module 265 applies processing based on the order of a sequence data item to the merged data. For example, when the data chunk identifiers are "T1T2", "T4", and "T3", the data chunk identifiers are sorted in the order of the number (order of "T1T2", "T3", and "T4"), and the intermediate datasets are merged in the sorted order.

<Another Example of Processing Steps of Data Aggregation Processing Module 261>

Moreover, according to the above-mentioned first embodiment as in Step S516 of FIG. 4, after the execution control module 233 has received the notice of the completion of the group extraction processing from all the group-extraction-processing execution servers 204, the execution control module 233 transmits the execution request for the data aggregation processing to the data-aggregation-processing execution servers 205. However, when the execution control module 233 transmits the execution request to the data-aggregation-processing execution servers 205 without waiting for the completion of the processing by all the group-extraction-processing execution servers 204, the intermediate dataset aggregation processing can be carried out partially, and the parallel distributed processing application can be efficiently processed.

Then, in Step S516 of FIG. 5, when the execution control module 233 receives the notice from, for example, a certain number of the group-extraction-processing execution servers 204 without waiting for receiving the notice of the completion of the group extraction processing from all the group-extraction-processing execution severs 204, the execution control module 233 transmits the execution request for the data aggregation processing to the data-aggregation-processing execution servers 205. Then, the data-aggregation-processing execution servers 205 applies the data aggregation processing to intermediate datasets 254 output from group-extraction-processing execution servers 204 which have completed the processing by a certain time.

FIG. 15 is a flowchart illustrating the processing steps when the data aggregation processing module 261 according to the first embodiment of this invention carries out the processing without waiting for the completion of the processing by all the group-extraction-processing execution servers 204.

In the flowchart illustrated in FIG. 15, to the respective steps of processing illustrated in FIG. 7, processing from Step S1411 to Step S1415 is newly added. It should be noted that the processing from Step S811 to Step S817 out of the processing illustrated in FIG. 15 is the same as the processing from Step S811 to Step S817 of FIG. 7, and a description thereof is thus omitted. A description is given of the processing from Step S1411 to Step S1415 of FIG. 15.

Then, the data aggregation processing module 261 proceeds from Step S814 to Step S1411, and judges, for all the acquired data chunk identifiers, whether or not values thereof have continuity (S1411). On this occasion, the intermediate-dataset-merging processing module 262 refers to all the data chunk identifiers acquired in Step S814, and judges whether or not there is continuity of the value in at least a part of all the acquired data chunk identifiers (such as serial numbers). When there is the continuity of the value in at least a part of the acquired data chunk identifiers, and the number of the data chunk identifiers is two or more ("YES" in S1411), the data aggregation processing module 261 proceeds to Step S1412. On the other hand, when there is no continuity of the value in all the acquired data chunk identifiers ("NO" in S1411), the data aggregation processing module 261 proceeds to Step S1415.

On this occasion, the case in which there is the continuity of the value in at least a part of the data chunk identifiers is, for example, a case in which data chunk identifiers are "T1", "T2", and "T4", and thus a part of the values of the data chunk identifiers, "T1" and "T2", are continuous. On the other hand, the case in which there is no continuity of the value in the data chunk identifiers is, for example, a case in which the data chunk identifiers are "T1", "T3", and "T5".

When the data aggregation processing module 261 proceeds to Step S1412, the data aggregation processing module 261 judges whether the intermediate datasets 254 have been acquired from all the group-extraction-processing execution servers 204 (S1412). When the intermediate datasets 254 have been acquired from all the group-extraction-processing execution servers 204 ("YES" in S1412), the data aggregation processing module 261 proceeds to Step S815. On the other hand, when the intermediate datasets 254 have not been acquired from all the group-extraction-processing execution servers 204 ("NO" in S1412), the data aggregation processing module 261 proceeds to Step S1413.

When the data aggregation processing module 261 proceeds to Step S1413, the data aggregation processing module 261 merges intermediate datasets 254 corresponding to continuous data chunk identifiers out of the data chunk identifiers acquired in Step S814 (S1413). On this occasion, the intermediate-dataset-merging processing module 262 carries out this processing. It should be noted that the intermediate-dataset-merging processing module 262 does not apply the processing to intermediate datasets 254 corresponding to discontinuous dataset identifiers. For example, when data chunk identifiers are "T1", "T2", and "T4", intermediate datasets to which the data chunk identifiers "T1" and "T2" are assigned are merged. On the other hand, the processing is not carried out for an intermediate dataset to which the data chunk identifier "T4" is assigned.

When the data aggregation processing module 261 proceeds to Step S1414 as a result of the judgment of "NO" in Step S813, the data aggregation processing module 261 judges whether the intermediate datasets 254 have been acquired from all the group-extraction-processing execution servers 204 (S1414). When the intermediate datasets 254 have been acquired from all the group-extraction-processing execution servers 204 ("YES" in S1414), the data aggregation processing module 261 proceeds to Step S816. On the other hand, when the intermediate datasets 254 have not been acquired from all the group-extraction-processing execution servers 204 ("NO" in S1414), the data aggregation processing module 261 proceeds to Step S1415.

When the data aggregation processing module 261 proceeds to Step S1415, the data aggregation processing module 261 waits until the data aggregation processing module 261 receives the execution request for the data aggregation processing from the parallel-distributed-processing control server 202 (S1415).

<Another Example of Data Chunk Identifier>

Moreover, according to the above-mentioned first embodiment as in S616 of FIG. 5, the information representing a serial number is assigned as the data chunk identifier, but the data chunk identifier is not limited to this case. For example, a representative value of a sequence data item (such as average or mean value) contained in the chunks of data obtained through the division may be assigned as the data chunk identifier. Moreover, for example, a time data, which is indicated by a clock installed in the parallel-distributed-processing control server 202 in case of dividing the sequence data into the plurality of chunks, may be assigned as the data chunk identifier.

Second Embodiment

Next, a description is given of a second embodiment of this invention referring to FIGS. 16 and 17.

According to the first embodiment, when sequence data is divided, information representing serial numbers is assigned, to the chunks of data obtained through the division, as data chunk identifiers, and, based on the serial numbers, the order of a sequence data item is judged, thereby merging intermediate datasets. However, as another method of assigning data chunk identifiers, the following method is conceivable, in which values of a sequence data item contained in head data of intermediate datasets generated by the group extraction processing are referred to, and, by comparing the values, the order of the sequence data items is judged, thereby merging the intermediate datasets.

According to the second embodiment of this invention, when sequence data is divided, data chunk identifiers are not assigned to the chunks of data obtained through the division, and when the aggregation processing of the data is carried out, based on head data contained in intermediate datasets, the order of a sequence data item is judged, the intermediate datasets are merged in the judged order, and a parallel distributed processing application is executed.

In the second embodiment, a description of the same configurations as in the first embodiment is properly omitted, and different configurations and operations are mainly described. Moreover, a configuration of a computer system according to the second embodiment is obtained by removing, from the system configuration according to the first embodiment illustrated in FIGS. 2 and 3, the order identifier setting module 232.

<Processing Steps of Data Division Processing Module 231 and Processing Steps of Execution Control Module 233 to Transmit Execution Request for Group Extraction Processing to Group-Extraction-Processing Execution Servers 204>

A description is given of processing steps of the data division processing module 231 and processing steps of the execution control module 233 to transmit the execution request for the group extraction processing to group-extraction-processing execution servers 204 according to the second embodiment.

Though the data division processing module 231 according to the second embodiment carries out Steps S611 to S615 out of a series of the processing steps illustrated in FIG. 5, the data division processing module 231 does not carry out Step S616. It should be noted that, in Step S617, in place of the data chunk identifiers, information capable of identifying group-extraction-processing execution servers 204 which process the chunks of data is set to the data division management table 235. Similarly in Step S618, in place of the data chunk identifiers, the information capable of identifying the group-extraction-processing execution servers 204 is set to the data allocation management table 236. The information capable of identifying the group-extraction-processing execution server 204 is, for example, a MAC address.

Moreover, in Step S615, when it is judged that the execution conditions are met ("YES" in S615), the processing proceeds to Step S513 illustrated in FIG. 4, and, when the parallel-distributed-processing control server 202 transmits the execution request for the group extraction processing to the group-extraction-processing execution servers 204, a sequence data processing identifier is added to the execution request. The sequence data processing identifier indicates that the parallel distributed processing application to be executed this time meets the execution conditions, and has a value "EXEC SEQUENCE PROCESSING", for example.

<Processing Steps of Group Extraction Processing Module 251>

FIG. 16 is a flowchart illustrating processing steps of the group extraction processing module 251 according to the second embodiment of this invention. The processing steps illustrated in FIG. 16 correspond to Step S514 of FIG. 4.

In a flowchart illustrated in FIG. 16, out of the respective processing steps illustrated in FIG. 6, the processing in Steps S714 and S715 is removed, and processing in Steps S1511 and S1512 is newly added. It should be noted that, out of the processing illustrated in FIG. 16, the processing from Step S711 to Step S713 is the same as the processing from Step S711 to Step S713 of FIG. 6, and a description thereof is thus omitted. On this occasion, a description is given of the processing from Step S1511 and Step S1512 of FIG. 16.

The group extraction processing module 251 proceeds from Step S713 to S1511, and judges whether the execution request received in Step S711 contains the sequence data processing identifier (S1511). When the sequence data processing identifier is contained ("YES" in S1511), the group extraction processing module 251 proceeds to Step S1512. On the other hand, when the sequence data processing identifier is not contained ("NO" in S1511), the group extraction processing module 251 finishes the processing.

When the group extraction processing module 251 proceeds to Step S1512, the group extraction processing module 251 assigns information capable of identifying the intermediate datasets 254 to the intermediate datasets 254 (S1512). On this occasion, the order identifier assignment module 232 adds, to the names of the intermediate datasets 254 generated in Step S713, data chunk identifiers for identifying the data chunks based on the group-extraction-processing execution server 204. The data chunk identifier on this occasion is information capable of uniquely identifying the group-extraction-processing execution server 204, such as the MAC address of the group-extraction-processing execution server 204. This data chunk identifier is required by the data-aggregation-processing execution server 205 to identify an intermediate dataset 254 acquired by the data-aggregation-processing execution server 205 by means of the bulk transfer of the intermediate dataset 254.

<Processing Steps of Data Aggregation Processing Module 261>

FIG. 17 is a flowchart illustrating processing steps of the data aggregation processing module 261 according to the second embodiment of this invention. The processing steps illustrated in FIG. 17 correspond to Step S517 of FIG. 4.

In a flowchart illustrated in FIG. 17, out of the respective processing steps illustrated in FIG. 7, the processing in Steps S813 to S815 is removed, and processing in Steps S1611 and S1613 is newly added. Out of the processing illustrated in FIG. 17, processing from Step S811 to Step S812, and processing from Step S816 to Step S818 are the same as the processing from Step S811 to Step S812, and the processing from Step S816 to Step S818 of FIG. 7, respectively, and a description thereof is thus omitted. On this occasion, a description is given of the processing from Step S1611 to Step S1613 of FIG. 17.

Then, the data aggregation processing module 261 proceeds from Step S812 to Step S1611, and judges whether data chunk identifiers are assigned to the intermediate datasets 254 acquired in Step S812 (S1611). When data chunk identifiers are assigned ("YES" in S1611), the data aggregation processing module 261 proceeds to Step S1612. On the other hand, when data chunk identifiers are not assigned ("NO" in S1611), the data aggregation processing module 261 proceeds to Step S816.

When the data aggregation processing module 261 proceeds to Step S1612, the data aggregation processing module 261 refers to the head data of each of the intermediate datasets 254 for all the intermediate datasets 254 acquired in Step S812, thereby acquiring the value of the sequence data item contained in the head data, and compares the values with one another (S1612). This processing is carried out by the intermediate-dataset-merging processing module 262. Methods of referring to the head data include a method of opening, when the intermediate dataset 254 is a file, the file and obtaining the head data. Moreover, methods of identifying the sequence data item contained in the head data include a method of analyzing definition information at the time of developing the sequence data aggregation processing, a method of including the sequence data item into the execution request to be transmitted from the parallel-distributed-processing control server 202 to the data-aggregation-processing execution server 205, and a method of causing a user to set the sequence data item.

Then, the data aggregation processing module 261 proceeds to Step S1613, sorts the data chunk identifiers, and merges the intermediate datasets 254 in the sorted order (S1613).

As described above, according to the second embodiment of this invention, when sequence data is divided, data chunk identifiers are not assigned to the chunks of data obtained through the division, and when the aggregation processing of the data is carried out, based on head data contained in intermediate datasets, the order of a sequence data item is judged, the intermediate datasets are merged in the judged order, and a parallel distributed processing application can be executed.

Though the respective embodiments of this invention have been described, the above-mentioned embodiments show an example of applications of this invention, and are not intended to limit the technical scope of this invention to the specific configurations of the above-mentioned embodiments.

For example, in the above-mentioned description, though the group-extraction-processing execution server 204 outputs, for each value of a key, an intermediate dataset, the unit of the output of an intermediate dataset is not limited to each value of a key. For example, an intermediate dataset corresponding to a combination of a plurality of values of a key may be output. On this occasion, to the name of the intermediate dataset, a value obtained by concatenating the plurality of keys with a division identifier of the key sandwiched therebetween is set. The division identifier of the key is, for example, a character string which does not match any values of a data item corresponding to the key contained in the input data.

Moreover, for example, in the above-mentioned description, as the input data, time-series data, which is a type of sequence data, is selected, but the sequence data to be subjected to this invention is not limited to the time-series data.

For example, the input data may be sales history data used by a company having a plurality of deployed sales stores when individual strategies intended for royal customers whose amount or number of times of purchase exceeds a certain value are planned. The sales history data is sequence data containing sales information, such as store IDs for identifying each store, purchaser IDs for identifying purchasers of articles, and purchased amounts, and the entire sales history data is arranged in an order of the store ID.

On this occasion, when royal customers are extracted from the sales histories collected from the respective stores to analyze trends, it is expected that the analysis is carried out in the following steps.

1. The sales history data is used as the input data, the purchaser is used as the key, the amount or the number of times of the purchase is calculated, and sales history data for each of the royal customers whose amount or number of times of the purchase is equal to or more than a certain value is extracted.

2. For the sales history data of the royal customer extracted on a purchaser basis, sales trends such as types of purchased articles are analyzed for each of the stores.

In this example of the sales history data, the sequence data item (store ID) serving as the input data and the key (purchaser ID) set for the group extraction processing are different from each other, and the processing focusing on the order of the sequence data item (store ID) is carried out.

While the present invention has been described in detail and pictorially in the accompanying drawings, the present invention is not limited to such detail but covers various obvious modifications and equivalent arrangements, which fall within the purview of the appended claims.

What is claimed is:

1. A parallel distributed processing method executed by a computer system comprising:

a parallel-distributed-processing control server for dividing sequence data into a plurality of chunks, and controlling parallel distributed processing to be applied to the sequence data;

a plurality of extraction processing servers each for extracting data included in one of the plurality of chunks obtained through the dividing; and a plurality of aggregation processing servers for merging data extracted by the plurality of extraction processing servers, and processing the merged data, the sequence data including a plurality of pieces of data each including a plurality of data items including at least a first data item and a second data item, the plurality of data items each including a value, the parallel distributed processing method including:

a first step of extracting, by each of the plurality of extraction processing servers, one of the plurality of chunks from the sequence data according to a value in the second data item, to thereby group the plurality of chunks, and assigning an identifier to each of the groups in sequential order to sequentially identify each of the groups;

a second step of sorting, by each of the plurality of aggregation processing servers, the groups in an order of a value in the first data item among the groups based on the identifier assigned to the each of the groups and merging groups having the same value in the second data item based on an order of the identifier assigned to the each of the groups; and a third step of processing, by the each of the plurality of aggregation processing servers, data in the order of the identifier assigned to the each of the groups.

2. The parallel distributed processing method according to claim 1, further including a step of notifying, by the parallel-distributed-processing control server, the each of the plurality of aggregation processing servers of a result of judgement in a case where it is judged that the sequence data is data arranged in the order of the value in the first data item, that the each of the plurality of extraction processing servers applies the first step to data which is not arranged in the order of the value in the first data item, and that the each of the plurality of aggregation processing servers carries out the processing focusing on the order of the value in the first data item, wherein the each of the plurality of aggregation processing servers applies the second step and the third step to the data in the group in a case of reception of a notice indicating that the result of the judgment is true.

3. The parallel distributed processing method according to claim 1, further including a step of assigning, by the parallel-distributed-processing control server, a serial number to each of the plurality of chunks in case of dividing the sequence data into the plurality of chunks, wherein the first step includes steps of:
extracting, by the each of the plurality of extraction processing servers, the serial number assigned to the one of the plurality of chunks; and
assigning, by the each of the plurality of extraction processing servers, the serial number as the identifier.

4. The parallel distributed processing method according to claim 3, wherein:

the serial number is a time data that is indicated by a system clock in case of division, by the parallel-distributed-processing control server, of the sequence data into the plurality of chunks;

in the first step, the serial number is assigned as the identifier, by the each of the plurality of extraction processing servers; and in the second step, the groups are merged, by the each of the plurality of aggregation processing servers, according to the identifier assigned to each of the groups.

5. The parallel distributed processing method according to claim 1, wherein in the merging step of the second step, the groups having the identifier thereof being continuous are merged.

6. The parallel distributed processing method according to claim 1, wherein in the determining step of the second step, an order of the group is determined based on the value in the first data item of first data included in the each of the groups.

7. A computer system comprising:

a parallel-distributed-processing control server for dividing sequence data into a plurality of chunks, and controlling parallel distributed processing to be applied to the sequence data;

a plurality of extraction processing servers each for extracting data included in one of the plurality of chunks obtained through the dividing; and a plurality of aggregation processing servers for merging data extracted by the plurality of extraction processing servers, and processing the merged data, wherein:

each of the parallel-distributed-processing server, the plurality of extraction processing servers, and the plurality of aggregation processing servers comprises:
a processor for executing a program;
a memory for storing the program to be executed by the processor; and
an interface coupled to the processor;

the sequence data includes a plurality of pieces of data each including a plurality of data items including at least a first data item and a second data item, the plurality of data items each including a value;

the each of the plurality of extraction processing servers extracts one of the plurality of chunks from the sequence data according to a value in the second data item, to thereby group the plurality of chunks, and assigning an identifier to each of the groups to sequentially identify each of the groups; and the each of the plurality of aggregation processing servers is configured to:
sort the groups in an order of the value in the first data item among the groups based on the identifier assigned to the each of the groups;
merge groups having the same value in the second data item based on an order of the identifier assigned to the each of the groups; and
process data in the order of the identifier assigned to the each of the groups.

8. The computer system according to claim 7, wherein:

the parallel-distributed-processing control server notifies the each of the plurality of aggregation processing servers of a result of the judgment in a case where it is judged that the sequence data is data arranged in the order of the value in the first data item, that the each of the plurality of extraction processing servers applies the first step to data which is not arranged in the order of the value in the first data item, and that the each of the plurality of aggregation processing servers carries out the processing focusing on the order of the value in the first data item; and the each of the plurality of aggregation processing servers applies the second step and the third step to the data in the group in a case of reception of a notice indicating that the result of the judgment is true.

9. The computer system according to claim 7, wherein:

the identifier is a serial number assigned to a first chunk included in the each of the groups, the assigned serial number being one of serial numbers assigned to the plurality of chunks; and the each of the plurality of aggregation processing servers merges the groups according to the identifier assigned to the each of the groups.

10. The computer system according to claim 7, wherein the each of the plurality of aggregation processing servers determines, an order of the group based on the value in first data item of first data included in the each of the groups.

11. The parallel distributed processing method according to claim 1, wherein the identifier assigned to the each of the groups is a value of a sequence data item included in the chunks.

12. The computer system according to claim 7, wherein the identifier assigned to the each of the groups is a value of a sequence data item included in the chunks.

* * * * *